US006834423B2

(12) United States Patent
Sugiyama et al.

(10) Patent No.: US 6,834,423 B2
(45) Date of Patent: Dec. 28, 2004

(54) METHOD OF MANUFACTURING A LIQUID DISCHARGE HEAD

(75) Inventors: Hiroyuki Sugiyama, Kanagawa (JP); Hiroyuki Ishinaga, Tokyo (JP); Yoshinori Misumi, Tokyo (JP); Yoichi Taneya, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 162 days.

(21) Appl. No.: 09/912,340

(22) Filed: Jul. 26, 2001

(65) Prior Publication Data

US 2002/0021337 A1 Feb. 21, 2002

(30) Foreign Application Priority Data

Jul. 31, 2000 (JP) ....................................... 2000-232411

(51) Int. Cl.$^{7}$ ............................. B23P 53/76; B44C 1/22

(52) U.S. Cl. ................... 29/611; 29/890.1; 29/DIG. 16; 347/61; 216/27; 216/83; 216/57

(58) Field of Search .................... 430/320; 29/DIG. 16; 347/65, 61, 62; 216/27, 83, 57, 97, 67, 65

(56) References Cited

U.S. PATENT DOCUMENTS 4,473,735 A 9/1984 Steffen
4,563,238 A 1/1986 Rhoades
4,684,436 A * 8/1987 Burns et al. .............. 216/65 X
4,723,129 A 2/1988 Endo et al.
5,262,000 A * 11/1993 Welbourn ................... 156/643
5,838,351 A * 11/1998 Weber ......................... 347/85
5,872,582 A * 2/1999 Pan ............................. 347/65
5,889,255 A 3/1999 Bogart et al. .......... 219/121.65
5,897,789 A * 4/1999 Weber ......................... 216/27
6,007,187 A 12/1999 Kashino et al. ............... 347/65
6,117,698 A * 9/2000 Atobe ......................... 438/21
6,374,482 B1 * 4/2002 Mihara ........................ 29/611

FOREIGN PATENT DOCUMENTS

EP 0 737 581 A 10/1996
EP 0 737 582 A 10/1996
EP 0 920 996 A2 6/1999
JP 4-2790 * 1/1992 .................. 216/27
JP 9-201966 8/1997

* cited by examiner

*Primary Examiner*—A. Dexter Tugbang
(74) *Attorney, Agent, or Firm*—Fitzpatrick, Cella, Harper & Scinto

(57) ABSTRACT

A method of manufacturing a liquid discharge head having a liquid flow path, a discharge energy generating device in the liquid flow path, a discharge port communicating with the liquid flow path, and a movable member facing the discharge energy generating device. The movable member is formed by a photolithographic technique, and a right-angled part and an acute-angled part of an edge of the movable member are removed so as to make a surface of the edge of the movable member curved. The curved surface of the movable member serves to reduce concentration of the stress on the movable member that occurs due to displacement of the movable member resulting from pressure of a bubble generated to discharge ink. Removal of the right-angled and acute-angled parts may be performed by soaking the movable member in an etching solution after formation of the movable member.

5 Claims, 15 Drawing Sheets

METHOD OF MANUFACTURING A LIQUID DISCHARGE HEAD

BACKGROUND OF THE INVENTION

1. Field of the Invention

The present invention relates to a liquid discharge head and a liquid discharge apparatus, which are used for a printer and a video printer as an output terminal of a copying machine, a facsimile, a word processor, a host computer, or the like and a method of manufacturing the liquid discharge head. Particularly, the present invention relates to the liquid discharge head having a device substrate, in which an electrothermal device is formed to generate thermal energy used for discharge of a liquid, a liquid discharge and recording apparatus on which the liquid discharge head is mounted, and the method of manufacturing the liquid discharge head. In other words, it relates to the liquid discharge head, which is used for recording by discharging a recording liquid such as ink from a discharge port as a flying droplet to attach the liquid to a recording medium, and the method of manufacture thereof.

2. Related Background Art

Ink jet recording method, i.e., so-called bubble jet recording method, in which energy such as heat is applied to ink to cause a status change of ink accompanied by an abrupt volume change, ink is discharged from the discharge port by an action force based on the status change of ink, and this is attached to a recording medium to form an image, has been conventionally known. In the recording apparatus using this bubble jet recording method, as disclosed in U.S. Pat. No. 4,723,139 specification, the discharge port to discharge ink, an ink path to communicate with this discharge port, and the electrothermal conversion body as energy generating means to discharge ink are generally arranged.

According to such a recording method, a high quality image can be recorded in a high speed and low noise and the discharge port for discharge of ink can be arranged in a high density in the head employing this recording method and therefore, there are many excellent advantages: a recorded image of high resolution and a color image can be readily yielded by a small apparatus. Thus, in recent years, this bubble jet recording method is used for many office appliances such as printer, copying machine, facsimile, or the like, and also used for such industrial systems as printing apparatus.

According to increasing application of such bubble jet technology to a product of many aspects, the following various requirements are recently increasing.

For example, a measure for the requirement of improving energy efficiency is exemplified by optimization of a heating element through adjustment of a thickness of a protecting film of the heating element. This measure expresses an effect to improve a conduction efficiency of heat generated to a liquid.

Furthermore, in order to yield the high quality image, a driving condition was proposed to provide the liquid discharge method capable of good ink discharge based on a fast speed of ink discharge and stable bubble occurrence and also in consideration of high speed recording, in order to obtain the liquid discharge head by which the discharged liquid is rapidly refilled in a liquid flow path, one, of which shape of the liquid flow path has been improved, has been proposed.

In addition, in reconsideration of a principle of liquid discharge, studies were carried out to provide a new liquid discharge method, not realized conventionally, employing a bubble and a head used therefor and there have been proposed the liquid discharge method and the head used therefor disclosed in Japanese Patent Application Laid-Open No. 9-201966.

Hereby, the conventional liquid discharge method and the head used therefor disclosed in Japanese Patent Application Laid-Open No. 9-201966 will be described below with reference to FIGS. 14A to 14D, FIG. 15 and FIG. 16. FIGS. 14A to 14D are figures to explain the discharge principle of the conventional liquid discharge head and each of FIG. 14A to FIG. 14D is a sectional view along with a direction of the liquid flow path. FIG. 15 is a partially broken-away perspective view of the liquid discharge head shown in FIGS. 14A to 14D, FIG. 16 is the sectional view of a modified example of the liquid discharge head shown in FIGS. 14A to 14D. The liquid discharge head shown in FIGS. 14A to 14D and 16 is one configured most basically to improve a discharge force and discharge efficiency by controlling a direction of travelling of the pressure and the direction of a bubble growth on the basis of the bubble in discharging the liquid.

"Upstream" and "downstream" used in the following description are expressions for the direction of the liquid flow from a source of supplying the liquid toward the discharge port through a top of the region, where the bubble occurs, or the direction of this configuration.

"Downstream side" related to the bubble itself represents mainly the discharge port of the bubble, which is regarded as works directly on discharge of the droplet. More specifically, to a center of the bubble, it means the downstream side in the flow direction as above described and the direction of the above configuration or the bobble generated in the region of the downstream side of the center of the area of the heating element. (Similarly, the "upstream side" of the bubble itself means, to the center of the bubble, the upstream side of the direction in the flow direction as described above and the direction of the above described configuration or the bubble generated in the region of the upstream side of the center of the area of the heating element.)

In addition, "comb shape" means a shape in which a fulcrum part of a movable member is a common member and a distal end of a free end of the movable member is opened.

In the liquid discharge head shown in FIGS. 14A to 14D, a device substrate 501 is one prepared by forming a silicon oxide film or a silicon nitride film with a purpose of insulation and heat reserving on the substrate made of silicon or the like and thereupon, an electric resistor layer and wire is patterned to constitute the heating element 502. This wire applies a voltage to the electric resistor layer and applies a current to the electric resistor layer to heat the heating element 502.

A ceiling board 511 is one to comprise a plurality of the liquid flow path 503 corresponding to all heating elements 502 and a common liquid chamber 505 for supply of the liquid to all liquid flow paths 503 and a flow path side wall is integrally installed to extend from a ceiling part to all heating elements 502. On the other hand, On the ceiling board 511, a plurality of the discharge ports 504 are formed to communicate with all liquid flow paths 503 with outside.

The ceiling board 511 can be formed by depositing a material such as silicon nitride, silicon oxide, or the like, that are used for a side wall of the liquid flow path 503, on the silicon substrate by a publicly known film forming method such as the CVD, etching a part of the liquid flow path 503 and then, adhering the ceiling part.

On the part, corresponding to the liquid flow path 503, of the device substrate 501, a plate-like movable member 506 facing the heating element 502 is installed like a cantilever and the one end of the upstream side of the movable member 506 is fixed to a base 507. The movable member 506 is supported by the base 507 to possess the fulcrum 508 in a displacing occasion. On the other hand, the movable member 506 is formed in comb shape by patterning the deposited film in a stage to form the liquid flow path 503 and the side wall thereof as described above by a publicly known film forming method and consists of such silicon-based material as silicon nitride, silicon oxide, or the like.

The movable member 506 has the fulcrum 508 in the upstream side of a large flow flowing from the common liquid chamber 505 to the discharge port 504 side by a discharging action of the liquid through the top of the movable member 506 and is arranged with a distance of 15 $\mu$m from the heating element 502 to have the free end 509 in the downstream side toward this fulcrum 508 and in a state to cover the heating element 502 in a position facing the heating element 502. The region between this heating element 502 and the movable member 506 becomes a bubble generating region 510.

Next, the action of the liquid discharge head configured as described above will be described with reference to FIG. 14A to FIG. 14D.

First, in FIG. 14A, ink is filled in the bubble generating region 510 and the liquid flow path 503.

Next, in FIG. 14B, heating the heating element 502 allows heat to work on the liquid of the bubble generating region 510 between the heating element 502 and the movable member 506 to generate the bubble 511 in the liquid on the basis of a film boiling phenomenon described in U.S. Pat. No. 4,723,129 specification or the like. Actions of the pressure created by occurrence of the bubble 511 and the bubble 511 on the movable member 506 are assigned higher priority. The movable member 506, as shown in FIG. 14B, FIG. 14C, or FIG. 15, is displaced to open largely to the discharge port 504 side around the fulcrum 508. In accordance with displacement or the state of displacement of the movable member 506, because of travelling of the pressure based on occurrence of the bubble 511 and the distal end of the bubble 511 having a width, a bubbling power of the bubble 511 can be easily led to the discharge port 504 side and hence, the discharge efficiency, discharge force, and discharge speed of the droplet and can be radically improved. For reference, a reference character C in the figure indicates the center of the area of the heating element.

As described above, the art described in Japanese Patent Application Laid-Open No. 9-201966 or the like is the art to control actively the bubble by making a relation of a position of the fulcrum and the free end of the movable member in the liquid flow path to the relation the free end of the movable member is located in the discharge port side, i.e., the downstream side and the movable member is arranged facing the heating element or the bubble generating region.

Each configuration of the device substrate 601 of the liquid discharge head, heating element 602, liquid flow path 603, discharge port 604, common liquid chamber 605, and bubble generating region 609, that are shown in FIG. 16, are same as those of the liquid discharge head described based on FIGS. 14A to 14D and thus, detailed description of the configurations thereof will be omitted.

In the liquid discharge head shown in FIG. 16, on the one end of the movable member 606 formed like the cantilever, a step part 606$a$ is made and to the device substrate 601, the movable member 606 is directly fixed. By this, the movable member 606 is held on the device substrate 601, the fulcrum 607 of the movable member 606 is established, and the free end 608 is made in the downstream side toward this fulcrum 607.

As described above, through installing the base on a fixed part of the movable member or installing the step on the fixed part of the movable member, a gap ranging from 1 to 20 $\mu$m is formed between the movable member and the heating part and an effect to improve a liquid discharge efficiency is fully expressed by the movable member. Consequently, according to the liquid discharge head based on the discharge principle described above, a synergistic effect of the bubble generated and the movable member displaced thereby can be yielded and the liquid around the discharge port can be efficiently discharged. Therefore, in comparison with the discharge method and the liquid discharge head of the conventional bubble jet system lacking the movable member, liquid discharge efficiency is improved.

In the liquid discharge head having the movable member as described above, the movable member is displaced according to a change of the pressure of the bubble and in displacement, a stress according to the displacement is added to the movable member. This stress works particularly largely on the movable member around a base (fulcrum) of the movable member to influence durability of the movable member.

However, as described above, in the liquid discharge head having the plate-like movable member, the material of the movable member is SiN and ceramic and hence, when there is s defect such as a crack and a burr in a edge of a side part thereof, durability of the movable member is occasionally distinctly reduced. For example, when the edge, particularly of the side part the upstream of the heating element, of the movable member has not been chamfered but the edge is made in a right-angled shape, the stress concentration occurs in the edge in displacement of the movable member. In addition, the deposition film is formed on the substrate and the deposition film is patterned to form the movable member and thus, a pin hole and the crack may occur in the edge of the side part of the movable member.

In addition, the movable member is formed on the substrate by film forming method and hence, shape of the movable member is influenced by the surface condition of a bottom layer on which the material layer of the movable member is formed. As a result, as described above, the shape of the edge of the side part of the movable member becomes occasionally in the shape easy to concentrate the stress in displacement of the movable member.

Consequently, in the case where a very large bubble occurs in the bubble generating region and the movable member is displaced in a very large degree, the movable member breaks at the base of the movable member. This is a problem.

An object of the present invention is to eliminate the part with an abruptly changed-shape of the movable member and make a structure possible to relax stress concentration by constituting the movable member with the film with an equal quality to improve durability of the movable member and provide the liquid discharge head and the liquid discharge apparatus, that are stable in discharge characteristic and of high reliability, and the method of manufacturing the liquid discharge head having such performances.

SUMMARY OF THE INVENTION

In order to attain the above described objects, according to the present invention, a liquid discharge head includes: a discharge port to discharge a liquid; a liquid flow path communicating with the above described discharge port and having a bubble generating region to let the liquid generate a bubble; a discharge energy generating device, installed in a substrate, to generate thermal energy to let the liquid generate the bubble in the above described bubble generating region; and a plate-like movable member located in an position opposite to the above described discharge energy generating device with a distance from the above described discharge energy generating device, fixed an end part of an upstream side thereof in a direction of a flow of the liquid in the above described liquid flow path and made the end of a downstream thereof free, and formed on the above described substrate by film formation, wherein the side part of the above described movable member has no right angle or no acute angle.

Also according to the present invention, wherein an edge of the side part of the above described movable member has a curved face.

Further, according to the invention, the liquid discharge head includes: the discharge port to discharge the liquid; the liquid flow path communicating with the above described discharge port and having the bubble generating region to let the liquid generate the bubble; the discharge energy generating device, installed in the substrate, to generate thermal energy to let the liquid generate the bubble in the above described bubble generating region; and the plate-like movable member located in the position opposite to the above described discharge energy generating device with the distance from the above described discharge energy generating device, fixed the end part of the upstream side thereof in the direction of the flow of the liquid in the above described liquid flow path and made the end of the downstream thereof free, and formed on the above described substrate by film formation, wherein an edge of the side part of said movable member is chamfered.

It is preferable that the above described movable member is one formed by photolithographic technique on a device substrate on which the above described discharge energy generating device is installed.

Also according to the present invention, the liquid discharge head having: the discharge port to discharge the liquid; the liquid flow path communicating with the above described discharge port and having the bubble generating region to let the liquid generate the bubble; the discharge energy generating device, installed in the substrate, to generate thermal energy to let the liquid generate the bubble in the above described bubble generating region; and the plate-like movable member located in the position opposite to the above described discharge energy generating device with the distance from the above described discharge energy generating device, fixed the end part of the upstream side thereof in the direction of the flow of the liquid in the above described liquid flow path and made the end of the downstream thereof free, and formed on the above described substrate by film formation, wherein on a surface of the above described substrate, there are formed a plurality of electrode layers, that is extended to at least a part of a region and a part around the region corresponding to a plurality of the above described movable member and is electrically connected to the above described discharge energy generating device; and in comparison with a width in a direction perpendicular to the direction of a liquid flow in the above described liquid flow path in all of the above described electrode layers, the width in the direction right-angled to the direction of a liquid flow in the above described liquid flow path and in parallel to a surface of the above described device substrate in the above described movable member becomes smaller.

It is preferable that a constituting material of the above described movable member is a ceramic.

Also it is preferable that the constituting material of the above described movable member is silicon nitride.

In the invention described above, the side part of the plate-like movable member, facing the discharge energy generating device keeping the distance from the device, formed by film formation has no right-angled or acute-angled part and the edge of the side part is curved or the edge is chamfered and thus, in discharging the liquid from the discharge port by displacing the movable member by letting the liquid to generate the bubble by the discharge energy generating device in the bubble generating region of the liquid flow path and in extreme displacement of the movable member, stress concentration is relaxed in the side part of the movable member. Therefore, the liquid discharge head as described above has no acutely changed part in the shape of the side part of the movable member and hence, the stress according to displacement thereof is applied to the movable member in displacement of the movable member, it is prevented to cause cracks of the movable member and fracture of the movable member. For example, the following structure is realized: in the case where the movable member is formed by photolithographic technique, the movable member is constituted by the film of the equal quality to allow stress concentration to relax. As a result, durability of the movable member is improved and discharge characteristics become stable and thus, the liquid discharge head of high reliability is realized.

Further, the liquid discharge apparatus has the above described liquid discharge head and actuation signal supply means for supplying an actuation signal for discharge of the liquid from the liquid discharge head.

Further, the liquid discharge apparatus according to the present invention has the above described liquid discharge head and recording-medium carrying means for carrying a recording medium to receive the liquid discharged from the liquid discharge head.

Further, the above described liquid discharge apparatus carries out recording through discharging an ink from the above described liquid discharge head and attaching the above described ink to the recording medium.

Furthermore, according to the present invention, a method of manufacturing the liquid discharge head includes: a device substrate, a plurality of discharge energy generating devices to generate thermal energy to let the liquid generate a bubble, being provided in parallel on a surface thereof; a plurality of the liquid flow paths, in which wXH of the above described discharge energy generating devices is arranged, having a bubble generating region to let the liquid generate a bubble; a plurality of discharge ports to discharge the liquid in the liquid flow path, each of the discharge ports communicating with each of the above described liquid flow paths; a flow path wall member mounted on the above described device substrate to form a plurality of the above described liquid flow paths; and a plurality of plate-like movable members, which are mounted on the above described device substrate to face each of said plurality of the above described discharge energy generating devices with an interval with respect to each of the above described discharge energy generating devices and an end part of an upstream side in the direction of the liquid flow in the above described liquid flow path is fixed and a downstream end is a free end, wherein the method of manufacturing the liquid discharge head, has a post-treatment step of removing a right-angled part projecting to make a distal end right-angled in an edge part of a side part of the above described movable member and an acute-angled part projecting to make the distal end acute-angled in the edge after a plurality of the above described movable members is formed on the above described device substrate by photolithographic technique.

Furthermore, it is preferable that in the above described post-treatment step, the edge of the side part of the above described movable member is processed to make the edge to curved one and the edge of the side part of the above described movable member is processed to make the edge to chamfered one.

Also it is preferable that the above described post-treatment step is the process to soak the above described movable member in a etching solution and the step of processing the above described edge by radiating a laser light on the edge of the edge of the side part of the above described movable member.

Also according to the present invention, the method of manufacturing the liquid discharge head includes: a device substrate, a plurality of discharge energy generating devices to generate thermal energy to let the liquid generate the bubble, being provided in parallel on a surface thereof; a plurality of liquid flow paths, in each of which each of the above described discharge energy generating devices is arranged, having the bubble generating region to let the liquid generate the bubble; a plurality of discharge ports to discharge the liquid in the liquid flow path, each of discharge ports communicating with each of the above described liquid flow paths; a flow path wall mounted on the above described device substrate to form a plurality of liquid flow paths; and a plurality of the plate-like movable members, which are mounted on the above described device substrate to face each of a plurality of the above described discharge energy generating devices with an interval with respect to each of the above described discharge energy generating devices and an end part of an upstream side in the direction of the liquid flow in the above described liquid flow path is fixed and the downstream end is the free end; a ceiling board, that is adhered to a face of a side opposite to the above described device substrate side, of a plurality of the above described side wall of the flow path; on the surface of the above described device substrate, a plurality of electrode layers, extended to at least the part of the region and the part around the region corresponding to a plurality of movable members and each of which is electrically connected to the above described discharge energy generating device, are formed; wherein the method of manufacturing the liquid discharge head comprises the steps of: preparing the above described device substrate in which a plurality of discharge energy generating devices are mounted on the surface of the above described device substrate and a plurality of electrode layers; forming a pattern member, corresponding to a space of the above described bubble generating region, on the surface of the above described device substrate; layering a first material layer for forming the above described movable member to cover the above described pattern member; layering an etching-resistant protection film, having etching-resistant property against the above described first material layer, on the surface of the above described first material layer; patterning the above described etching-resistant protection film to make the above described movable member of which angle is right-angled to the direction of the liquid flow in the above described liquid flow path and width is small in a shape in parallel to the surface of the above described device substrate in the above described movable member; layering a second material layer for forming the above described side wall of the flow path to cover the above described etching-resistant protection film patterned; removing the part, corresponding to the above described liquid flow path, of the above described second material layer by etching and forming the above described side wall of the flow path and the above described liquid flow path; and removing the above described pattern member after the step for forming the above described liquid flow path and forming the above described movable member.

Using silicon nitride as the material of the above described movable member is preferable.

Also according to the method of manufacturing the above described liquid discharge head, it is preferable to use silicon nitride as the material of the above described movable member, PSG as the material of the above described pattern member, aluminum as the material of the above described etching-resistant protection film.

According to the method of manufacturing the above described liquid discharge head, after a plurality of the plate-like movable members are formed on the device substrate, on which a plurality of the discharge energy generating devices are mounted, by photolithographic technique, the right-angled part and the acute-angled part projecting from the edge part of the side part of the movable member are removed to make the edge to a curved face and to make the edge chamfered and thus, the following structure is realized: the acutely changed part is removed from the shape of the edge of the side part of the movable member and the movable member is constituted by the film of equal quality and hence, the stress concentration is relaxed. In this liquid discharge head, in displacing the movable member by the discharging action of the liquid and in extreme displacement of the movable member, stress concentration is relaxed in the edge of the side part of the movable member. Therefore, even if stress according to displacement of the movable member is applied to the movable member, it is prevented to cause cracks of the movable member and fracture of the movable member. As a result, durability of the movable member is improved and discharge characteristics become stable and thus, the liquid discharge head of high reliability is realized.

DETAILED DESCRIPTION OF THE PREFERRED EMBODIMENTS

Embodiments of the present invention will be described below with reference to drawings.

First Embodiment

Figure 1:
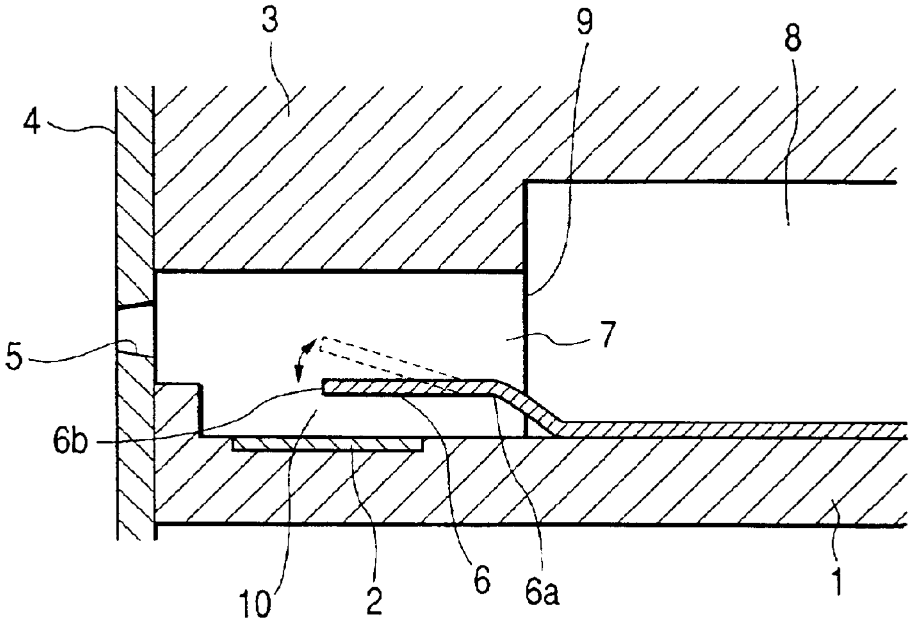
FIG. 1 is a sectional view along with a direction of a liquid flow path for explanation of a basic structure of a liquid discharge head according to a first embodiment of the present invention.

FIG. 1 is a sectional view along with a direction of a liquid flow path for explanation of a basic structure of a liquid discharge head according to a first embodiment of the present invention. The liquid discharge head according to the present embodiment has, as shown in FIG. 1, a device substrate 1, in which a plurality (in FIG. 1 only one is shown) of heating elements 2 as a discharge energy generating device, which generates thermal energy to let the liquid generate the bubble and apply thermal energy to the liquid, are installed in parallel, a ceiling board 3 adhered to a top of the device substrate 1, and an orifice plate 4 adhered to a front end of the device substrate 1 and the ceiling board 3.

The device substrate 1 is one in which silicon oxide film or silicon nitride film are formed on the substrate made of silicon or the like with an object of insulation and heat reservation and thereon, the electric resistor layer and wire constituting the heating element 2 is patterned. The heating element 2 is heated by applying a voltage from this wire to the electric resistor layer and run a current to the electric resistor layer. And on the wire and the electric resistor layer, the protecting film is formed to protect them from ink and on the protecting film, cavitation-resistant film is formed to protect cavitation caused by debubbling ink.

On a face of the heating element 2 side of the device substrate 1, a side wall 9 of the flow path for forming a plurality of liquid flow paths 7 corresponding to all heating elements 2 and a member for forming a common liquid chamber 8 to hold temporarily the liquid to supply to the liquid flow path 7 is formed. To the face of the device substrate 1 side, of the member and the side wall 9 of the flow path, the ceiling board 3 is adhered. The ceiling board 3 and the member and the side wall 9 consist of a silicon-based material. The member to form the liquid flow path 7 and the common liquid chamber 8 is formed by depositing such material as silicon oxide or silicon nitride to become the side wall 9 on the device substrate 1, that is a silicon substrate, by such publicly known film forming method as CVD and then, the part of the liquid flow path 7 is etched.

In the orifice plate 4, a plurality of discharge ports 5 are formed to correspond to all liquid flow paths 7 and communicate with the common liquid chamber 8 through all liquid flow paths 7. The orifice plate 4 is one consisting of the silicon-based material and formed by cutting the silicon substrate, on which the discharge port 5 is formed, to a thickness ranging from 10 to 150 μm for example. For reference, the orifice plate 4 is not always necessary for the present invention, but it is possible that in replacement to installation of the orifice plate 4, a wall corresponding to a thickness of the orifice plate 4 is left on the distal face of the ceiling board 3 and the discharge port 5 is formed in this part to make the ceiling board having the discharge port.

In addition, in the liquid flow path 7 of this liquid discharge head, a cantilever-like movable member 6 is installed by arranging facing the heating element 2. All movable members 6 are those plate-like, having a flat face part oppositely to the heating element 2 and are thin films formed using such silicon-based material as silicon oxide or silicon nitride on the device substrate 1. As consisting material for the movable members 6, ceramic can be used and the side part of the movable members 6 is processed to eliminate the part with an abruptly changed-shape of the edge of the side part, described later.

The movable members 6 has a fulcrum 6*a* in the upstream side of the large flow flowing from the common liquid chamber 8 to the discharge port 5 side by the discharging action of the liquid through the movable member 6 and is arranged with the predetermined distance from the heating element 2 to have a free end 6*b* in the downstream side toward this fulcrum 6*a* and the free end 6*b* in the position facing the heating element 2 is positioned in the center of the heating element 2. The region between this heating element 2 and the movable member 6 becomes the bubble generating region 10. Particularly, as described later, the part to be processed to remove any right-angled part and acute-angled part in the side part of the movable members 6 is at least upstream side of the heating element.

On the basis of the above constitution, when the heating element 2 is heated, the liquid located in the bubble generating region 10 between the movable member 6 and the heating element 2 is subjected to the action of heat and hence, on the heating element 2, the bubble caused by the film boiling phenomenon grows. The pressure created by growth of the bubble works on the movable member 6 in priority and the movable member 6, as shown in FIG. 1 by a broken line, is displaced to open largely toward the discharge port 5 side around the fulcrum 6*a*. In accordance with displacement or the state of displacement of the movable member 6, travelling of pressure created by occurrence of the bubble and growth of the bubble itself are led to the discharge port 5 side to discharge the liquid from the discharge port 5.

In other words, on a bubble generating region 10, by installing the movable member 6 having the fulcrum 6*a* in the upstream side (the common liquid chamber 8 side) of the flow of the liquid in the liquid flow path 7 and having the free end 6*b* in the downstream side (the discharge port 5 side), the direction of travelling of the pressure created by the bubble is led to the downstream side and thus, the pressure created by the bubble contributes to discharge directly and efficiently. And, the growth direction itself is, similarly to the direction of travelling of the pressure, led to the downstream direction to grow larger in the downstream than the upstream. As described above, controlling the growth direction of the bubble itself by the movable member and controlling the direction of travelling of the pressure created by the bubble allows the radical discharge characteristics such as the discharge efficiency, discharge force, and discharge speed to be improved.

On the other hand, when the bubble enters in a debubbling step, the synergistic effect caused by an elastic force of the movable member 6 debubbles the bubble rapidly and finally, the movable member 6 recovers an initial position shown by a solid line in FIG. 1. At this time, to compensate a volume of the bubble shrunk in the bubble generating region 10 and to compensate the volume of the liquid discharged, the liquid flows in from the upstream, i.e., the common liquid chamber 8 side, to refill the liquid in the liquid flow path 7. Refilling this liquid is carried out in accordance with the recovering action of the movable member 6, efficiently, rationally, and stably.

In such liquid discharge head according to the present embodiment, as described above, the device substrate 1 is configured by the silicon substrate, the ceiling board 3, the side wall 9 of the flow path, the orifice plate 4, and the movable member 6 consist of the silicon-based material and the material of all members contain silicon. By this, the stress created by a difference in a linear expansion ratio of all components is suppressed. By this, a mechanical characteristic of the liquid discharge head is improved, discharge characteristic is stabilized, and the liquid discharge head having the high reliability is realized.

Figure 2A:
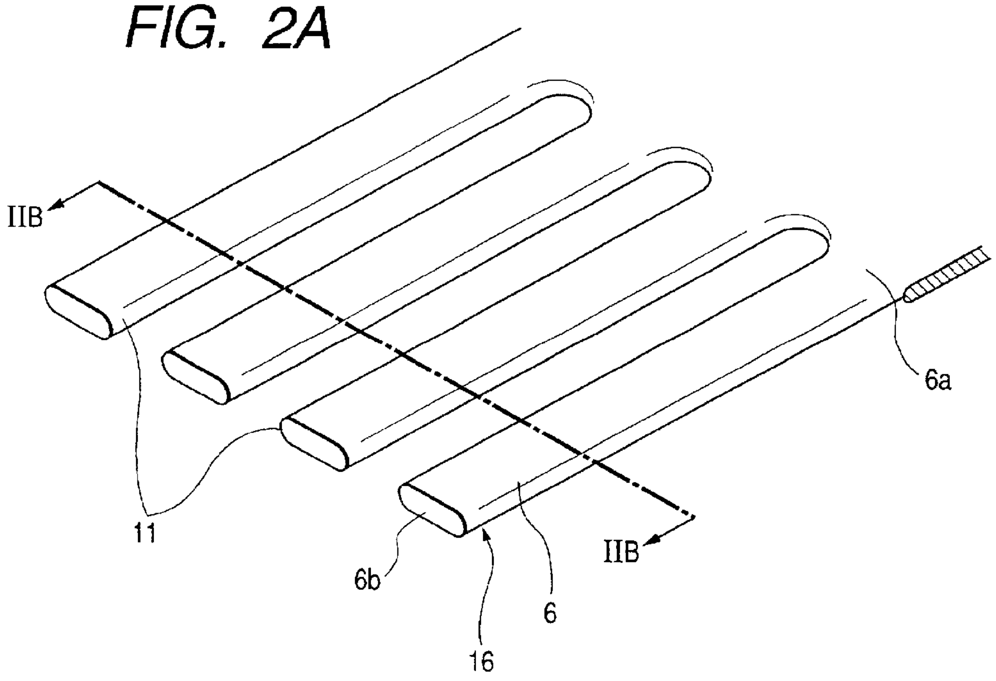
FIGS. 2A and 2B are a perspective side view and a sectional view showing a shape of a plurality of side walls of a movable member mounted on the liquid discharge head shown in FIG. 1, respectively.
Figure 2B:
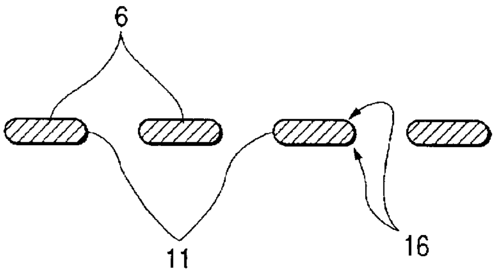

FIGS. 2A and 2B are perspective side view and a sectional view showing the shape of a plurality of side walls of the movable member mounted on the liquid discharge head according to the present embodiment, FIG. 2A is the perspective side view of the movable member and FIG. 2B is the sectional view of an IIB—IIB line in FIG. 2A. In the present embodiment, as shown in FIGS. 2A and 2B, a fulcrum part of a plurality of movable members 6 is used as the common member and the member including a plurality of movable members 6 is made as the comb.

As described above, the movable member 6 is displaced according to the pressure change of the bubble and the stress according to the displacement is applied to the movable member 6. Particularly, this stress works largely on the movable member 6 around the fulcrum (base) 6*a* of the movable member 6 and thus, if the defect such as burrs and cracks occur on the edge of the side part of the movable members 6, durability of the movable members 6 is distinctly reduced occasionally. Specifically, there is the following problem: the movable member 6 fractures around the base thereof. Therefore, according to the present invention, the edge of the side part of the movable members 6 has no defect parts such as the acute-angled part, burr, and crack and also, the configuration thereof is adapted to be difficult to cause defects in the movable members 6 in displacement of the movable members 6.

According to the present embodiment, as an example of the shape of such movable members 6, as shown in FIG. 2A and FIG. 2B, in the post-treatment following formation of the movable members 6, the shape of both the side parts of the movable members 6 is made in the curved face (R part) 11 and all the edges 16 of the movable members 6 are made in a smooth curved face. Immediately after formation of the movable members 6 by photolithographic technique, the right-angled part projecting to make the distal end right-angled in the edge of the side part of the movable member 6 and the acute-angled part projecting to make the distal end acute-angled in the edge are formed. Through steps of the post-treatment to make both the sides of the movable member 6 to the curved face 11, those right-angled part and acute-angled part are removed to remove the abruptly changed-shape of the edge of the side part of the movable member 6. By this, the movable member 6 is adapted to be the structure in which the constitution by the equal quality film can relax stress concentration.

Specifically, as the step to process the edge of the side part of the movable member 6, an R part is formed on the end part of the movable member 6 by the post-treatment by wet etching using the etching solution. Wet etching in this step is not one like the patterning to remove an unnecessary region, but is light etching carried out to remove the acute-angled part and the burr occurred in the edge of the side part of the movable member 6 and hence, the etching solution used is one on which time rate (etching rate) is small for etching the movable member 6 or etching is carried out for a short time. Therefore, the size of the movable member 6 does not largely change from the desired size predetermined before the post-treatment. In addition, in pattering of the movable member 6, the movable member 6 can be formed in previous consideration of a width, length, and thickness for etching through this post-treatment.

Figure 3:
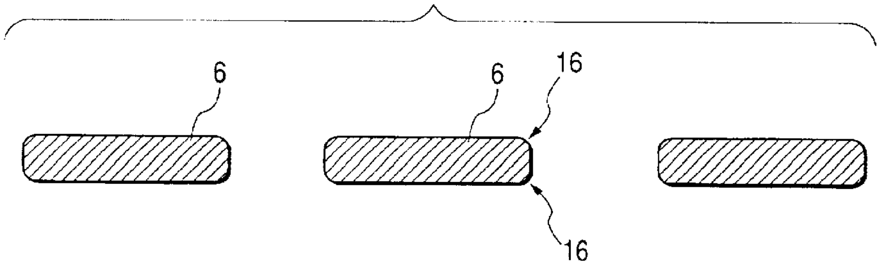
FIG. 3 is a sectional view of the movable member formed in case of using an etching solution having a lower etching rate than that of the etching solution used for post-treatment of the movable member shown in FIGS. 2A and 2B or shortening an etching time.

FIG. 3 is the sectional view of the movable member formed in case using the etching solution having the lower etching rate than that of the etching solution used for the post-treatment of the movable member 6 shown in FIGS. 2A and 2B or shortening the etching time. The movable member 6 shown in FIG. 3, in comparison with the case shown in FIGS. 2A and 2B, the region to be etched in the movable member 6 is small and thus, the curved face formed in all the edges 16 of the movable member 6 becomes smaller than the case of FIGS. 2A and 2B. Therefore, a minimal etching is allowed for the region unnecessary and also, size compensation, as described above, in patterning of the movable member 6 becomes unnecessary. In addition, the post-treatment step is completed for a short time than the case of FIGS. 2A and 2B. Such post-treatment is preferably applied to the case where burr and crack occurred in the edge of the side part of the movable member 6, shown in FIGS. 2A and 2B, are small.

Through the post-treatment of the movable member 6 as described above, removal of such defects as the acute-angled part and burr, which occur in the movable member 6, to make the surface of the movable member 6 smooth improves durability and reliability of the movable member 6.

Figure 4A:
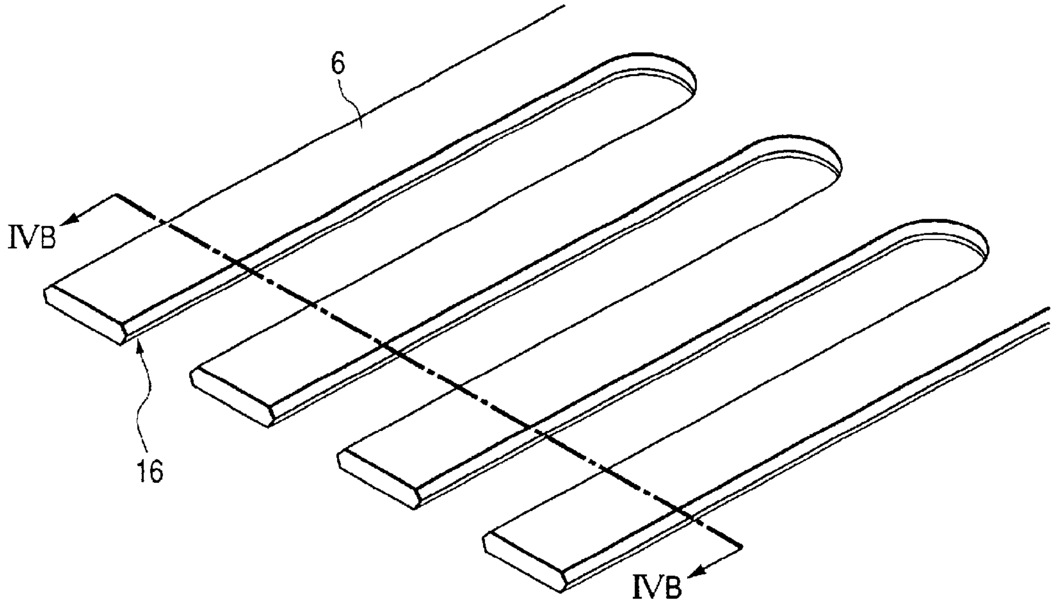
FIGS. 4A and 4B are the perspective side view and the sectional view showing another example of the shape of the side wall of the movable member, respectively.
Figure 4B:
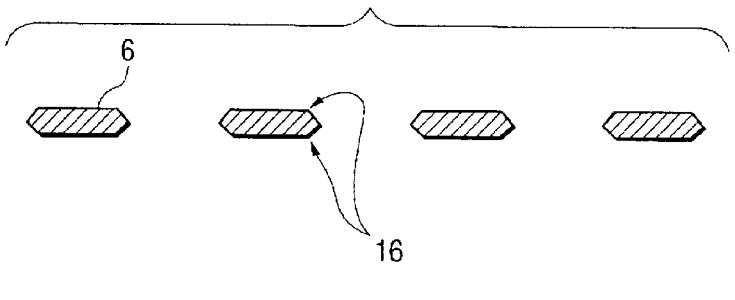

FIGS. 4A and 4B are the perspective side view and the sectional view showing another example of the shape of the side wall of the movable member 6. FIG. 4A is the perspective side view and FIG. 4B is an IVB—IVB line sectional view of FIG. 4A. According to examples shown in FIG. 4A and FIG. 4B, all the edges 16 of the movable member 6 are chamfered to make the angle made by adjacent faces in the edge 16 blunt. Therefore, in this example, in the edges 16 of the movable member 6, the right-angled part projecting to make the angle of the distal end part right-angled and the acute-angled part projecting to make the angle of the distal end part acute-angled are not formed. By this, it is prevented to concentration of the stress in the edge of the side part of the movable member 6 in displacement of the movable member 6. In the case where the shape of the edges 16 of the movable member 6, the post-treatment of the movable member 6 carries out physical processing such as laser processing to perform chamfering of the edges of the movable member 6.

As described above, in the liquid discharge head according to the present embodiment, the edge of the side part of the movable member 6 is made in the curved face and the edge is chamfered and thus, in displacing the movable member 6 to discharge ink from the discharge port 5 and in excessive displacement of the movable member 6, stress concentration is relaxed in the edge of the side part of the movable member 6. Consequently, in such liquid discharge head, there is no abruptly changed-shape of the edge of the side part of the movable member 6 and therefore, even if the stress according to the displacement is applied to the movable member 6 in displacement of the movable member 6, it is prevented to cause cracks of the movable member 6 and fracture of the movable member 6. As a result, durability of the movable member 6 is improved, discharge characteristic of the liquid discharge head is stabilized, and the liquid discharge head having the high reliability is realized.

Figure 5B:
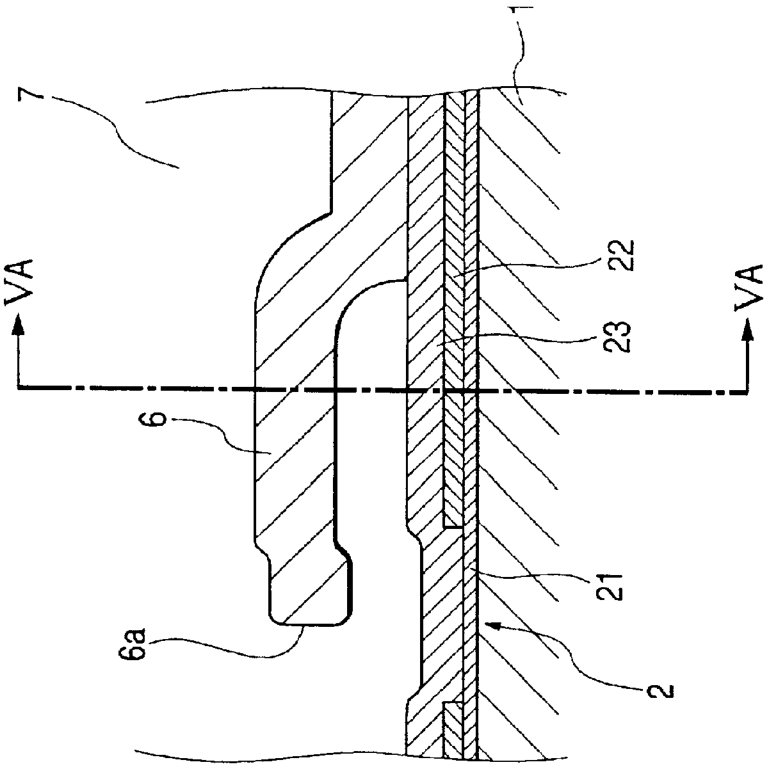
FIGS. 5A and 5B are the sectional views for explanation of a relationship between a size of the movable member and the size of an electrode layer mounted on a device substrate.
Figure 5A:
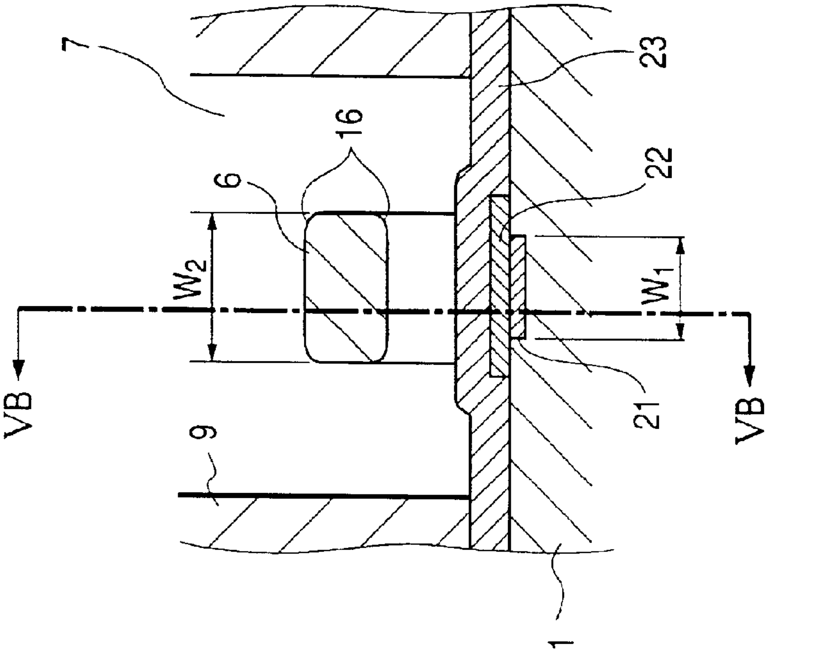

FIGS. 5A, 5B are the sectional views for explanation of a relationship between the size of the movable member and the size of the electrode layer mounted on the device substrate. FIG. 5A is the sectional view in the direction vertical to the direction, to which the liquid flow path extends, and is the sectional view of a VA—VA line of FIG. 5B. On the other hand, FIG. 5B is the sectional view along with the direction of the liquid flow path and is the sectional view of a VB—VB line of FIG. 5A.

In the liquid discharge head according to the present embodiment, as shown in FIG. 5A and FIG. 5B, in a surface layer of the device substrate 1, a heater layer 21 extending to the direction of the flow path of the liquid flow path 7 is formed for each liquid flow path 7. On and circumference of the surface of the heater layer 21, similarly to the heater layer 21, the electrode layer 22 extending to the direction of the flow path of the liquid flow path 7 is formed for each liquid flow path 7. On the surface, of the part around a free end 5*b* of the movable member 6, of the heater layer 21, the electrode layer 22 is not formed and the part of the heater layer 21 becomes the heating element 2 shown in FIG. 1. Therefore, on the surface of the device substrate 1, a plurality of electrode layers 22, that extends to a part of the region corresponding to a plurality of the movable member 6 and a place near the region thereof, is formed. All the electrode layers 22 are electrically connected to the heating element 2 of the heater layer 21 corresponding to the electrode layer 22; through the electrode layers 22, the voltage is applied to the heating element 2 to run the current to the heating element 2. The protection film 23 is formed on entire surfaces of these the heater layer 21 and the electrode layer 22 and entire surfaces of the device substrate 1 and the heater layer 21 and the electrode layer 22 are covered with the protection film 23. The movable member 6 is formed of the surface of the protection film 23 and the edge of the side part of the movable member 6 is made in the curved face.

And, in the liquid discharge head according to the present embodiment, to avoid formation of the acute-angled part in the edge of the side part of the movable member 6 in formation of the movable member 6 on the device substrate 1 by the photolithographic technique, as shown in FIG. 5A, the width $W_2$ in the direction right-angled to the direction of the liquid flow in the liquid flow path 7 in the movable member 6 and in parallel to the surface of the device substrate 1 becomes smaller than the width $W_1$ in the direction right-angled to the direction of the liquid flow in the liquid flow path 7 in the all the electrode layers 22. As described above, by making the width $W_2$ of the movable member 6 smaller than the width $W_1$ of the electrode layers 22, as described later, in a middle stage of forming the deposition film on the device substrate 1 to make the movable member 6 on the device substrate 1, it can be prevented to form the acute-angled part in the edge of the device substrate 1 side of the side part of the movable member 6.

Figure 6B:
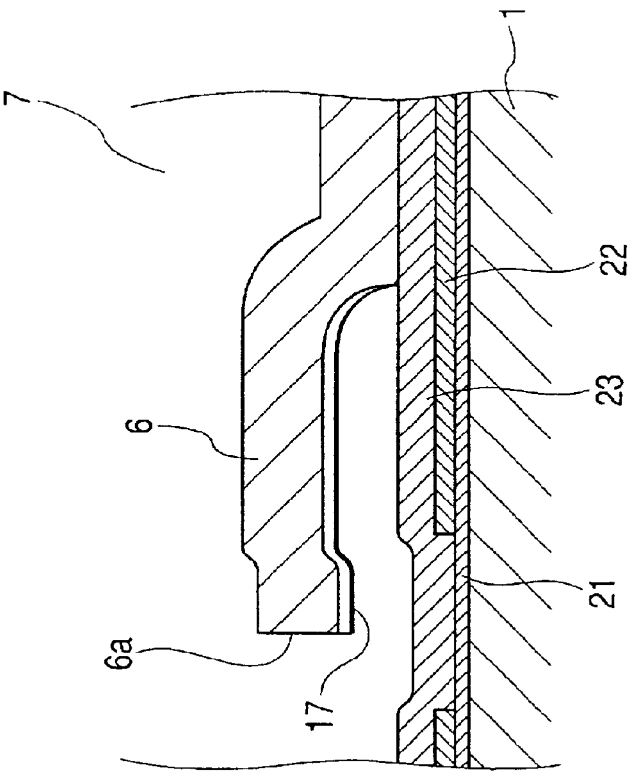
FIGS. 6A and 6B are the sectional views showing comparative examples with the liquid discharge head shown in FIGS. 5A, 5B.
Figure 6A:
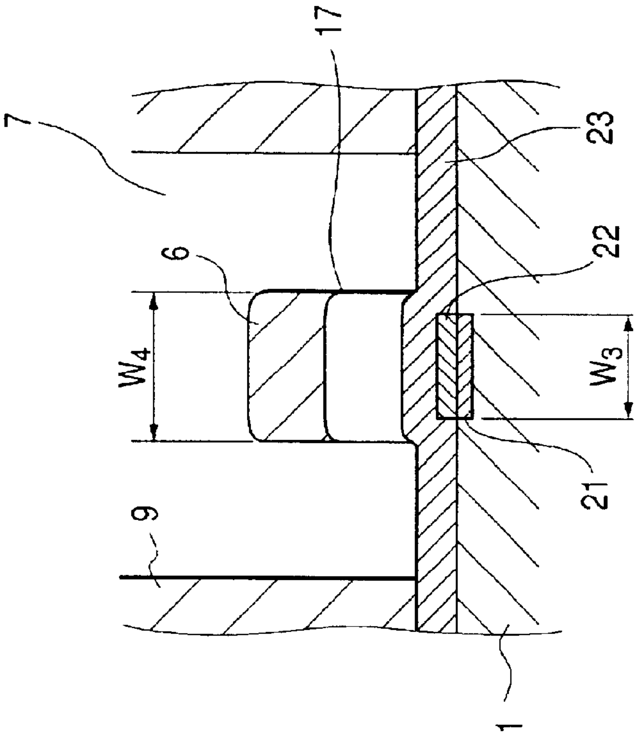

FIGS. 6A, 6B are the sectional views showing comparative examples with the liquid discharge head shown in FIGS. 5A and 5B. In comparative examples shown in FIGS. 6A and 6B, no post-treatment has been carried out to remove the acute-angled part and the burr occurred in the edge of the side part of the movable member 6 and hence, as shown in FIG. 6A, the width $W_4$ in the direction right-angled to the direction of the liquid flow in the liquid flow path 7 in the movable member 6 and the direction in parallel to the surface of the device substrate 1 becomes larger than the width $W_3$ in the direction right-angled to the direction of the liquid flow in the liquid flow path 7 in the all the electrode layers 22. As described above, when the width $W_4$ of the movable member 6 becomes larger than the width $W_3$ of the electrode layers 22, in layering the deposition film on the device substrate 1 to form the movable member 6, as shown in FIG. 6A, the acute-angled part 17 occasionally formed in the edge of the device substrate 1 side of the side part of the movable member 6. Therefore, in the liquid discharge head according to the present embodiment, to avoid formation of the acute-angled part 17 in the edge of the side part of the movable member 6, as shown in FIG. 5A, the width $W_2$ of the movable member 6 is made smaller than the width $W_1$ of the electrode layers 22.

Next, the method of manufacturing the liquid discharge head according to the present embodiment will be described below. FIGS. 7A to 7J and FIGS. 8F to 8M are figures for explanation of the method of manufacturing the liquid discharge head according to the present embodiment. FIGS. 7A to 7E and FIGS. 8F to 8I are sectional views in a vertical direction to the direction to which the liquid flow path extends and FIGS. 7F to 7J and FIGS. 8J to 8M are sectional views along with the direction of the liquid flow path. The liquid discharge head according to the present embodiment is manufactured through steps from FIG. 7A and FIG. 7F to FIG. 7J, FIG. 8F to FIG. 8I and FIG. 8M.

Figure 7A:
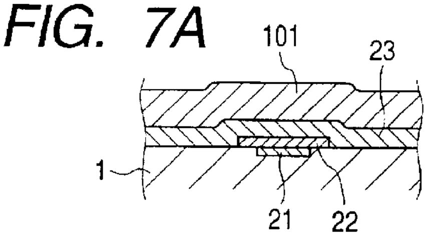
FIGS. 7A, 7B, 7C, 7D, 7E, 7F, 7G, 7H, 7I and 7J are the sectional views for explanation of the method of manufacturing the liquid discharge head according to the first embodiment of the present invention.
Figure 7F:
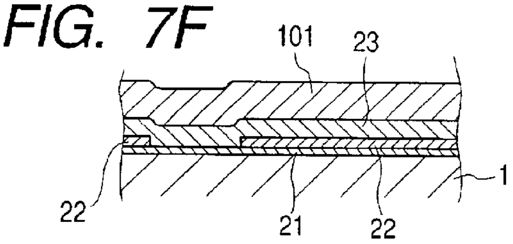

First, in FIG. 7A and FIG. 7F, on the entire surface of the heating element 2 side of the device substrate 1, a PSG (phospho silicate glass) film 101 is formed by the CVD method under the condition of a temperature 350° C. The film thickness of the PSG film 101 corresponds to the gap between the movable member 6 and the heating element 2 and the film thickness of PSG film 101 is prepared ranging from 1 to 20 $\mu$m. By this, on the basis of a balance of the whole of the liquid flow path of the liquid discharge head, the effect of the movable member 6 is expressed distinctly. Next, in order to pattern the PSG film 101, after coating a resist on the surface of the PSG film 101 by spin coat, exposure and development are conducted by photolithography and the part corresponding to the part, to which the movable member 6 is fixed, of the resist is removed.

Figure 7B:
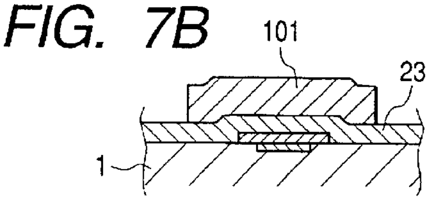
Figure 7G:
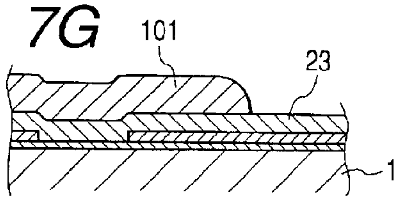

And, in FIG. 7B and FIG. 7G, the part, not covered with the above described resist, of the PSG film 101 is removed by wet etching using hydrofluoric acid buffered. Thereafter, the above described resist left on the surface of the PSG film 101 is removed by plasma ashing using oxygen plasma or soaking the device substrate 1 in a resist removing agent. By this, a part of the PSG film 101 is left on the surface of the device substrate 1 and the part of the PSG film 101 becomes the pattern member corresponding to the space of the bubble generating region 10. Through these steps, on the surface of the device substrate 1, the pattern member corresponding to the space of the bubble generating region 10 is prepared.

Figure 7C:
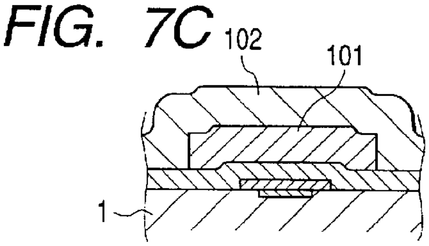
Figure 7H:
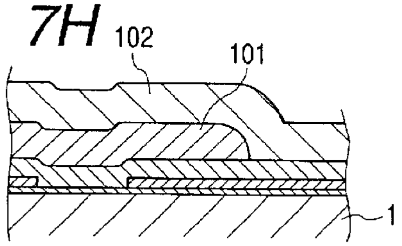

Next, in FIG. 7C and FIG. 7H, on the surface of the device substrate 1 and the PSG film 101, a SiN film 102, that has the thickness ranging from 1 to 10 μm, as the first material layer is formed using ammonium and silane gas as materials under the condition of a temperature of 400° C. by the plasma CVD method. A part of this SiN film 102 becomes the movable member 6. As composition of the SiN film 102, $Si_3N_4$ is most preferable and in order to yield the effect of the movable member 2, the ratio of N in the case when Si is 1 may be 1 and a range from 1 to 1.5, respectively. This SiN film is commonly used for a semiconductor process and has alkali resistance, chemical stability, and ink resistance. A part of the SiN film 102 becomes the movable member 2 and hence, if a quality of this film has the structure and composition to yield most suitable physical properties for the movable member 2, the method of manufacturing this film is not restricted. For example, as method of forming the SiN film 102, in replacement to the plasma CVD method as described above, ordinary pressure CVD, LPCVD, bias ECRCVD, microwave CVD, or spattering method, and coating method may be usable. On the other hand, for the SiN film, in order to improve physical properties such as stress, rigidity, and Young's modulus and chemical properties such as alkali resistance and acid resistance in accordance with usage thereof, preparation of multilayer film may be carried out by changing composition stepwise. Also, preparation of multilayer film may be carried out by adding impurities stepwise and monolayer may be prepared by adding impurities.

Figure 7D:
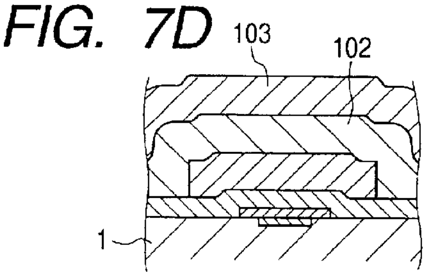
Figure 7I:
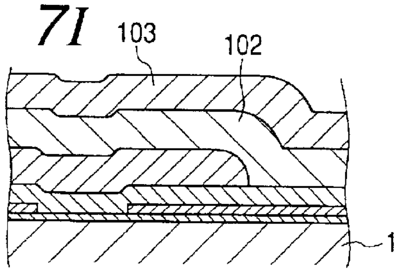

Next, in FIG. 7D and FIG. 7I, an etching-resistive protection film 103 is formed on the surface of the SiN film 102. As the etching-resistive protection film 103, an Al film having the thickness of 2 μm was formed by spattering method. This etching-resistive protection film 103 prevents, in carrying out etching to form the side wall 9 of the flow path in the next step, a damage to the SiN film 102 to become the movable member 6. Hereby, in the case where the movable member 6 and the side wall 9 of the flow path are formed by almost same material, etching in formation of the side wall 9 of the flow path etches the movable member 6 and it is necessary to prevent the damage of the movable member 6 caused by etching; therefore, on the surface, in the side opposite to the device substrate 1, of the SiN film 102 to become the movable member 6, the etching-resistive protection film 103 is formed.

Next, to make the SiN film 102 and the etching-resistive protection film 103 to the predetermined shape, the resist is coated on the surface of the etching-resistive protection film 103 by spin coat method or the like to perform patterning by photolithography.

Figure 7E:
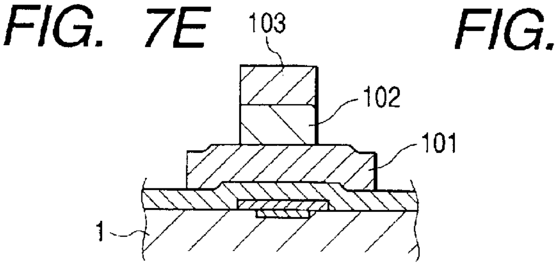
Figure 7J:
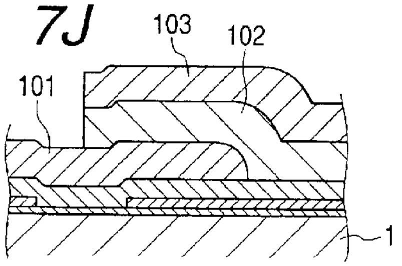

Thereafter, in FIG. 7E and FIG. 7J, the SiN film 102 and the etching-resistive protection film 103 are etched by the dry etching method using $CF_4$ gas or the reactive ion etching method to make the SiN film 102 and the etching-resistive protection film 103 in the shape of the movable member 6. By this, the movable member 6 is formed on the surface of the device substrate 1 by film formation and patterning.

In this step, as described based on FIGS. 5A and 5B, the width $W_2$ of the movable member 6 is made smaller than the width $W_1$ of the electrode layers 22 and therefore, on the edge of the device substrate 1 side of the SiN film 102, the acute-angled part 17 as shown in FIGS. 6A and 6B is not formed. Hereby, the etching-resistive protection film 103 and the SiN film 102 are simultaneously subjected to patterning and it may be carried out to pattern only the etching-resistive protection film 103 in the shape of the movable member 6 and in a subsequent step, the SiN film 102 may be patterned.

Figure 8F:
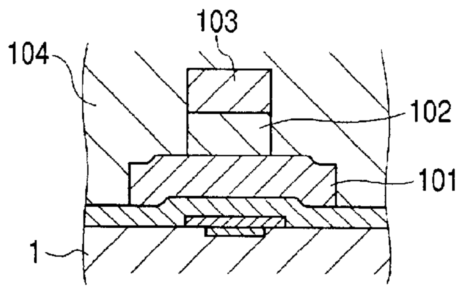
FIGS. 8F, 8G, 8H, 8I, 8J, 8K, 8L and 8M are the sectional views for explanation of the method of manufacturing the liquid discharge head according to the first embodiment of the present invention.
Figure 8G:
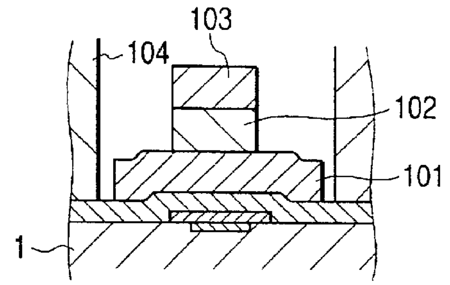
Figure 8H:
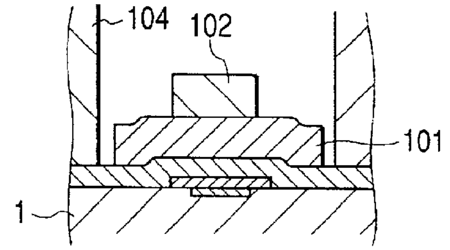
Figure 8I:
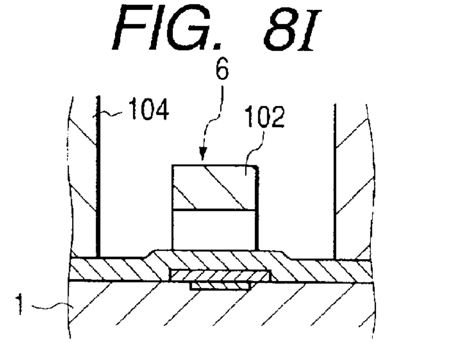
Figure 8J:
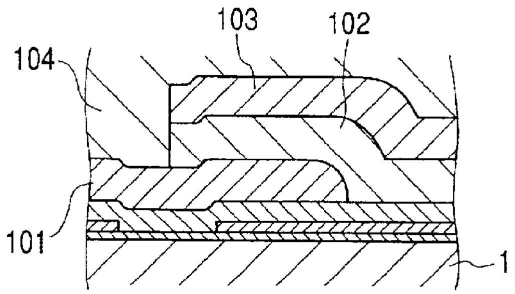

Next, as shown in FIGS. 8F and 8J, on the surface of the etching-resistive protection film 103, the PSG film 101, and the device substrate 1, as a second material layer, the SiN film 104 with the thickness ranging from 20 to 40 μm is formed. When the SiN film 104 is desired to form in the high speed, microwave CVD method is used. This SiN film 104 becomes finally the side wall 9 of the flow path. The SiN film 104 is not influenced by film characteristics, such as a pin hole density and density of the film, required for the manufacturing steps of the semiconductor. The SiN film 104 requires simply to satisfy an ink-resistive property and a mechanical strength for the side wall 9 of the flow path and it is not a problem that high speed formation of the SiN film 104 causes somewhat higher density of the pin hole of the SiN film 104.

In addition, the SiN film was used in this example; however, the material the side wall 9 of the flow path is not restricted to the SiN film, but it may be one, that is the SiN film containing impurities and the SiN film of which composition has been changed, having the ink-resistive property and the mechanical strength and may be an inorganic film such as a diamond film, amorphous carbon film hydrogenated (diamond-like carbon film), alumina-based, zirconia-based, or the like.

Figure 8K:
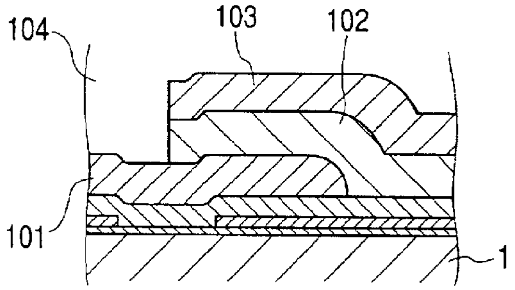

Next, in order to make the SiN film 104 in the predetermined shape, the resist is coated on the surface of the SiN film 104 by spin coat or the like and patterning is carried out by photolithography. Thereafter, dry etching using $CF_4$ gas or the reactive ion etching method is applied to make, as shown in FIG. 8G and FIG. 8K, the SiN film 104 in the shape of the side wall 9 of the flow path. Or, if higher speed etching is desired, ICP (inductively coupled plasma) etching method is most suitable for etching of a thick SiN film 104. Through such steps, the side wall 9 of the flow path is formed on the surface of the device substrate 1. And, after the SiN film 104 was etched, by plasma ashing using oxygen plasma or soaking the device substrate 1 in a resist removing agent, the resist left on the SiN film 104 is removed.

Figure 8L:
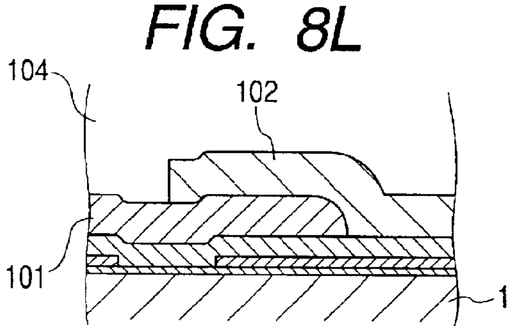

Next, as shown in FIGS. 8H and 8L, the etching-resistive protection film 103 on the SIN film 102 is removed by wet etching or dry etching. Hereby, if there is no restriction to these methods and only the etching-resistive protection film 103 can be removed, any method can be applied. Or, if the etching-resistive protection film 103 does not badly influence to characteristics of the movable member 6 and the etching-resistive protection film 103 is a Ta film having the high ink resistance, the etching-resistive protection film 103 need not be removed.

Figure 8M:
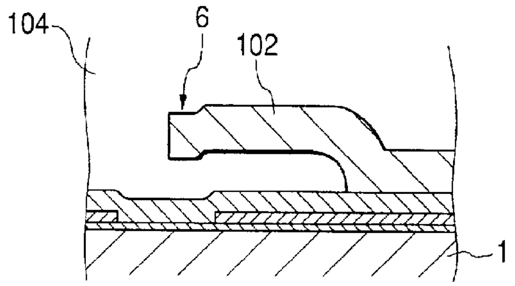

Next, as shown in FIGS. 8I and 8M, the PSG film 101, which is an underlayer of the SiN film 102, is removed by hydrofluoric acid buffered. By this, a plurality of movable members 6, which are made of the SiN film 102, left on the device substrate 1, are made on the device substrate 1.

After this step, through removal of the right-angled part and the acute-angled part appeared on the edge of the side part of the movable member 6 by the post-treatment as described above, as shown in FIGS. 5A and 5B, the liquid discharge head, in which all of the edge of the side part of the movable member 6 made in the curved face, is manufactured. Specifically, the movable member 6 formed through the step as described above is subjected to wet etching by using the liquid for etching the SiN film, or laser processing or the like. By this, the surface of the movable member 6 becomes smooth or the side part disappears by C face processing, a defect such as cracks seldom occurs in displacement, and durability of the movable member 6 is improved.

In the method, of manufacturing the liquid discharge head, as describe above, the movable member 6 and the side wall 9 are directly made on the device substrate 1 and therefore, in comparison with the case where the liquid discharge head is assembled after those members are separately prepared, an assembling step is become unnecessary to simplify the manufacturing step. On the other hand, there is no step of adhering the movable member 6 by using an adhesive or the like and thus, no stain of the liquid inside the liquid flow path 7 occurs. In addition, in assembling, the surface of the device substrate 1 is not injured and also dust does not occur in adhesion of the movable member 6. And, all members are formed through the manufacturing steps, such as photolithography and etching, of the semiconductor and hence, the movable member 6 and the side wall 9 can be formed in high precision and high density.

Second Embodiment

Figure 9A:
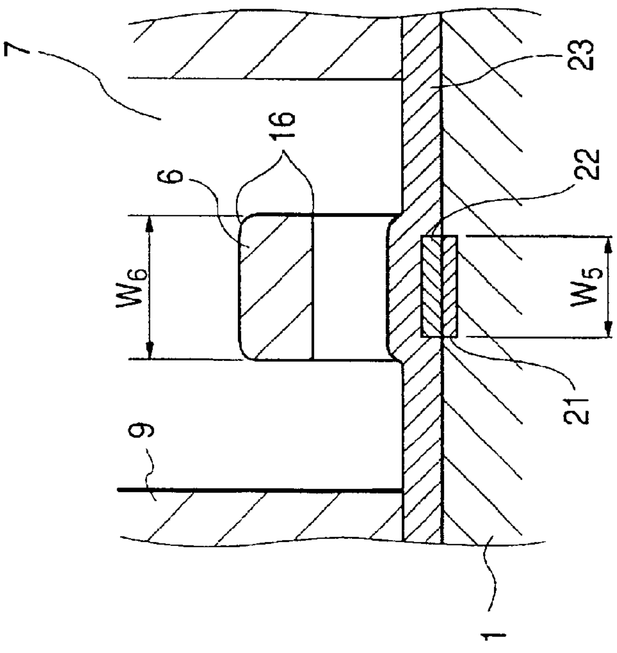
FIGS. 9A and 9B are the sectional views for explanation of a constitution of the liquid discharge head prepared by the method of manufacturing the liquid discharge head according to the second embodiment of the present invention.
Figure 9B:
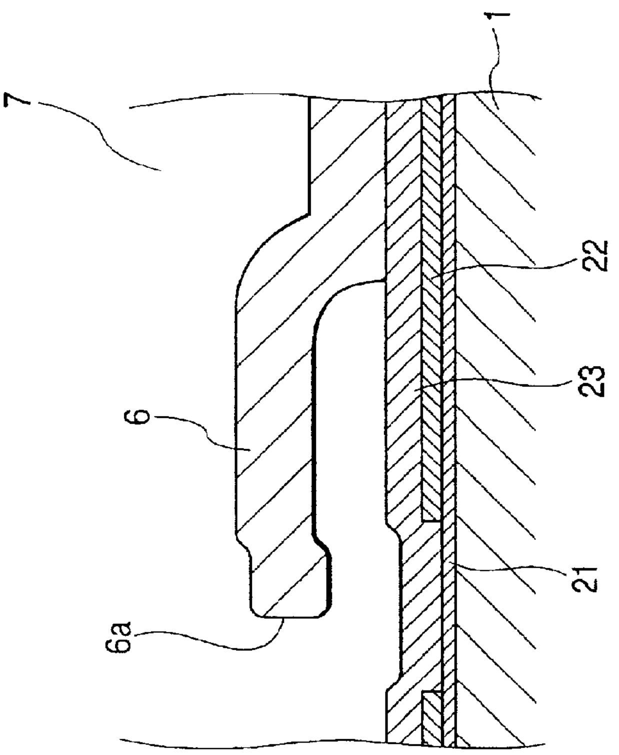

FIGS. 9A and 9B are the sectional views for explanation of the constitution of the liquid discharge head prepared by the method of manufacturing the liquid discharge head according to a second embodiment of the present invention. The liquid discharge head according to the present embodiment differs mainly from the first embodiment in the point that the width of the electrode layer on the device substrate is smaller than the width of the movable member. Below, the point of difference from the first embodiment will be mainly described. In FIGS. 9A and 9B, the same one as that of the first embodiment will be assigned to a same numeral.

In the liquid discharge head according to the present embodiment, as shown in FIGS. 9A and 9B, the width $W_6$ in the direction right-angled to the direction of the liquid flow in the liquid flow path 7 in the movable member 6 and the direction in parallel to the surface of the device substrate 1 becomes larger than the width $W_5$ in the direction right-angled to the direction of the liquid flow in the liquid flow path 7 in the all the electrode layers 22. Also in manufacturing such liquid discharge head, as described below, removing surely the right-angled part and the acute-angled part appeared on the edge of the side part of the movable member 6 makes improvement of durability of the movable member 6 possible.

Below, the method of manufacturing the liquid discharge head as shown in FIGS. 9A and 9B will be described. FIGS. 10A to 10J and FIGS. 11F to 11M are drawings for explanation of the method of manufacturing the liquid discharge head as shown in FIGS. 9A and 9B. FIG. 10A to FIG. 10E and FIG. 11F to FIG. 11I are the sectional views in the direction vertical to the direction in which the liquid flow path extends and FIG. 10F to FIG. 10J and FIG. 11J to FIG. 11M are the sectional views along with the direction of the liquid flow path. The liquid discharge head according to the present embodiment is manufactured through steps from FIG. 10A and FIG. 10F to FIG. 11I and FIG. 11M.

Next, the method of manufacturing the liquid discharge head according to the present embodiment is almost same as that described for the first embodiment based on FIGS. 7A to 7J and FIGS. 8F to 8M and an outline of the method for manufacture will be described below.

Figure 10A:
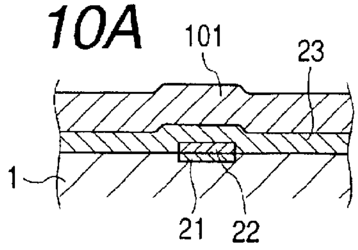
FIGS. 10A, 10B, 10C, 10D, 10E, 10F, 10G, 10H, 10I and 10J are the sectional views for explanation of the method of manufacturing the liquid discharge head according to the second embodiment of the present invention.
Figure 10F:
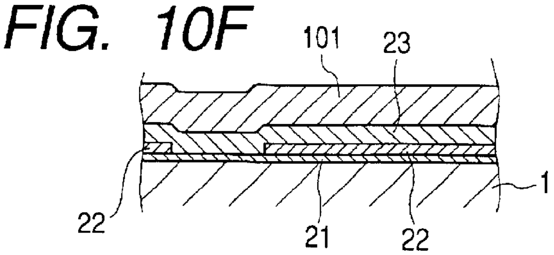

First, in FIG. 10A and FIG. 10F, on the entire surface of the heating element 2 side of the device substrate 1, the PSG (phospho silicate glass) film 101 with the film thickness ranging from 1 to 20 μm is formed by the CVD method. Next, in order to pattern the PSG film 101, after coating the resist on the surface of the PSG film 101 by spin coat method or the like, exposure and development are conducted by photolithography and the part corresponding to the part, to which the movable member 6 is fixed, of the resist is removed.

Figure 10B:
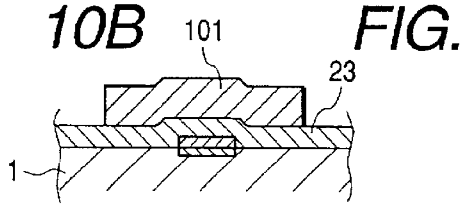
Figure 10G:
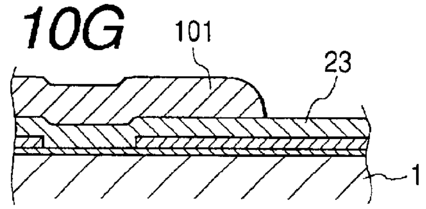

And, in FIG. 10B and FIG. 10G, the part, not covered with the above described resist, of the PSG film 101 is removed by wet etching using hydrofluoric acid buffered. Thereafter, the above described resist left on the surface of the PSG film 101 is removed by plasma ashing using oxygen plasma or soaking the device substrate 1 in the resist removing agent. By this, the part of the PSG film 101 is left on the surface of the device substrate 1 and the part of the PSG film 101 becomes the pattern member corresponding to the space of the bubble generating region 10.

Figure 10C:
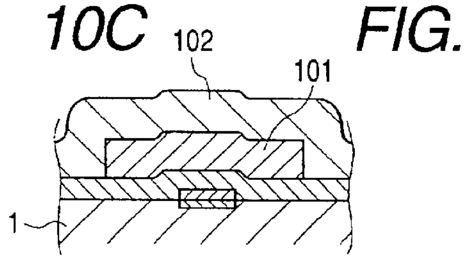
Figure 10H:
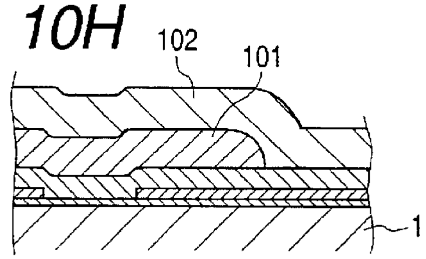

Next, in FIG. 10C and FIG. 10H, on the surface of the device substrate 1 and the PSG film 101, the SiN film 102, that has the thickness ranging from 1 to 10 μm, as the first material layer is formed using ammonium and silane gas as materials under the condition of the temperature of 400° C. by the plasma CVD method. The part of this the SiN film 102 becomes the movable member 6.

Figure 10D:
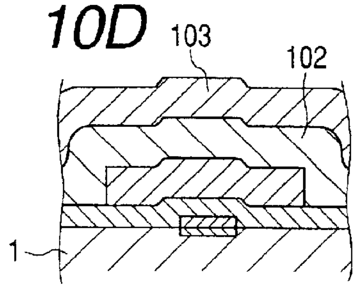
Figure 10I:
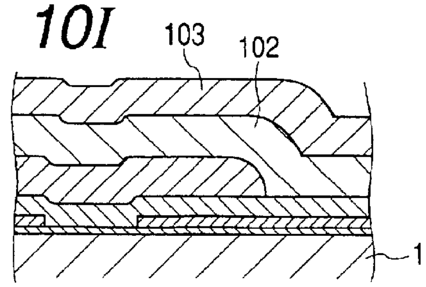

Next, in FIG. 10D and FIG. 10I, the etching-resistive protection film 103 is formed on the surface of the SiN film 102. As the etching-resistive protection film 103, the Al film having the thickness of 2 μm was formed by spattering method.

Next, to make the SiN film 102 and the etching-resistive protection film 103 to the predetermined shape, the resist is coated on the surface of the etching-resistive protection film 103 by spin coat method or the like to perform patterning by photolithography.

Figure 10E:
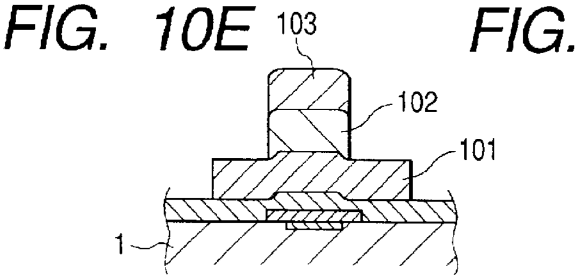
Figure 10J:
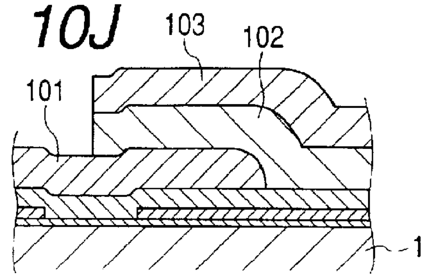

Thereafter, in FIG. 10E and FIG. 10J, the SiN film 102 and the etching-resistive protection film 103 are etched by the dry etching method using $CF_4$ gas or the reactive ion etching method to make the SiN film 102 and the etching-resistive protection film 103 in the shape of the movable member 6. The movable member 6 is formed on the surface of the device substrate 1 by this step.

Figure 11F:
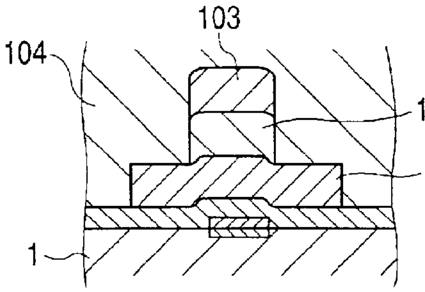
FIGS. 11F, 11G, 11H, 11I, 11J, 11K, 11L and 11M are the sectional views for explanation of the method of manufacturing the liquid discharge head according to the second embodiment of the present invention.
Figure 11G:
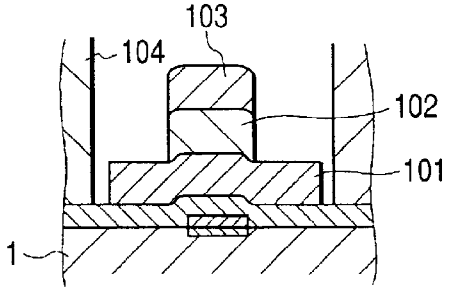
Figure 11H:
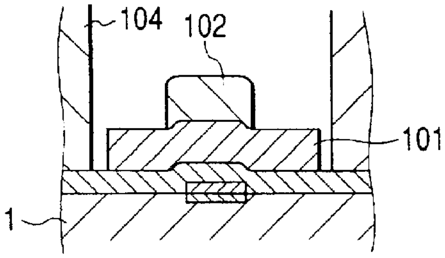
Figure 11I:
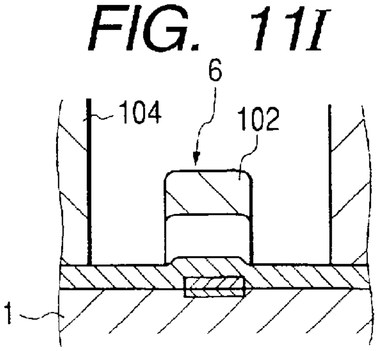
Figure 11J:
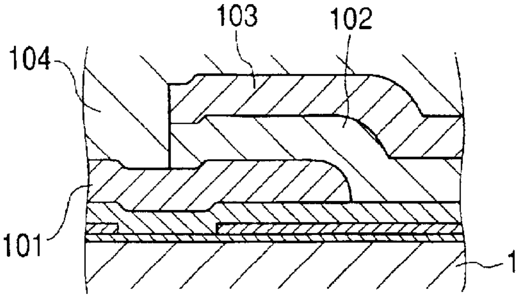

Next, in FIG. 11F and FIG. 11J, on the surface of the etching-resistive protection film 103, the PSG film 101, and the device substrate 1, as the second material layer, the SiN film 104 with the thickness ranging from 20 to 40 μm is formed. This SiN film 104 becomes finally the side wall 9 of the flow path. The SiN film 104 is not generally influenced by film characteristics, such as the pin hole density and density of the film, required for the manufacturing steps of the semiconductor.

Figure 11K:
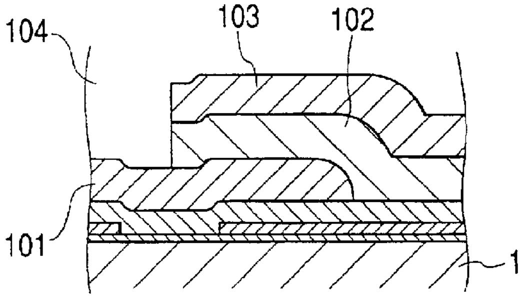

Next, in order to make the SiN film 104 in the predetermined shape, the resist is coated on the surface of the SiN film 104 by spin coat or the like and patterning is carried out by photolithography. Thereafter, dry etching using $CF_4$ gas or the reactive ion etching method is applied to make, as shown in FIG. 11G and FIG. 11K, the SiN film 104 in the shape of the side wall 9 of the flow path. Through such steps, the side wall 9 of the flow path is formed on the surface of the device substrate 1. And, after the SiN film 104 was etched, by plasma ashing using oxygen plasma or soaking the device substrate 1 in the resist removing agent, the resist left on the SiN film 104 is removed.

Figure 11L:
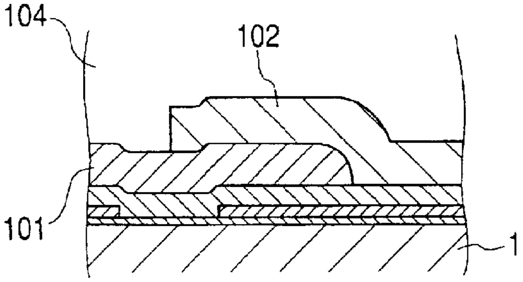

Next, as shown in FIGS. 11H and 11L, the etching-resistive protection film 103 on the SiN film 102 is removed by wet etching and dry etching.

Figure 11M:
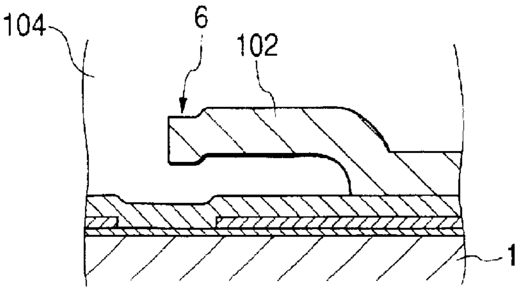

Next, as shown in FIGS. 11I and 11M, the PSG film 101, which is the underlayer of the SiN film 102, is removed by hydrofluoric acid buffered. By this, a plurality of movable members 6, which are made of the SiN film 102, left on the device substrate 1, are made on the device substrate 1.

After this step, through removal of the right-angled part and the acute-angled part appeared on the edge of the side part of the movable member 6 by carrying out the post-treatment, as described in the first embodiment, for the movable member 6, as shown in FIGS. 9A and 9B, the liquid discharge head, in which all of the edge of the side part of the movable member 6 made in the curved face, is manufactured. Specifically, the movable member 6 formed through the step as described above is subjected to wet etching by using the liquid for etching the SiN film, or laser processing or the like. By this, the surface of the movable member 6 becomes smooth or the edge disappears by C face processing, the defect such as cracks seldom occurs in displacement, and durability of the movable member 6 is improved.

(Liquid Discharge Apparatus)

Figure 12:
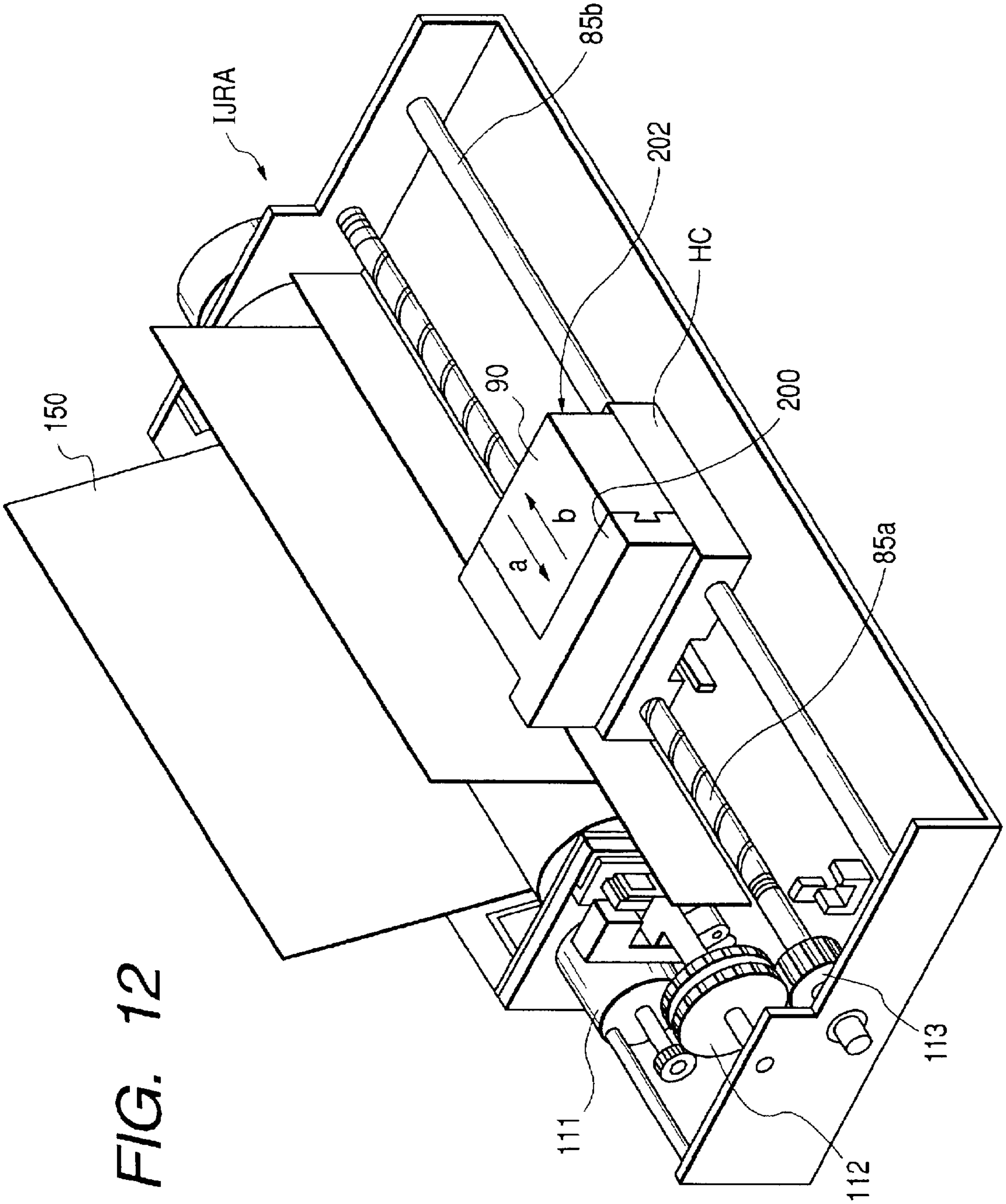
FIG. 12 is the perspective side view showing the liquid discharge apparatus on which the liquid discharge head according to the present invention is mounted.

FIG. 12 is the perspective side view showing the liquid discharge apparatus on which the liquid discharge head according to the first or second embodiment as described above is mounted. Hereby, particularly, description will be presented using the liquid discharge apparatus IJRA which uses ink as the discharge liquid. As shown in FIG. 12, in a carriage HC installed on the liquid discharge apparatus IJRA, a liquid container 90, which contains ink, and a head cartridge 202, from which the liquid discharge head 200 can be detached, are mounted. On the other hand, on the liquid discharge apparatus IJRA, recording medium carrying means is mounted and in a width direction (direction of arrows a and b) of the recording medium 150 such as a recording paper to be carried by the recording medium carrying means, the carriage HC moves reciprocatively. In the liquid discharge apparatus IJRA, when the actuating signal is supplied from the actuation signal supply means not illustrated to the liquid discharge head 200 on the carriage HC, a recording liquid is discharged from the liquid discharge head 200 to the recording medium 150 in accordance with this the actuating signal.

In addition, the liquid discharge apparatus IJRA has a motor 111 as a driving source to drive the recording medium carrying means and the carriage HC, a gear 112 and 113 to transmit a power from the motor 111 to the carriage HC, and a carriage shaft 85*a* and 85*b*. By using this liquid discharge apparatus IJRA, discharging the liquid to various recording medium allowed yielding a recorded matter with a good image.

Figure 13:
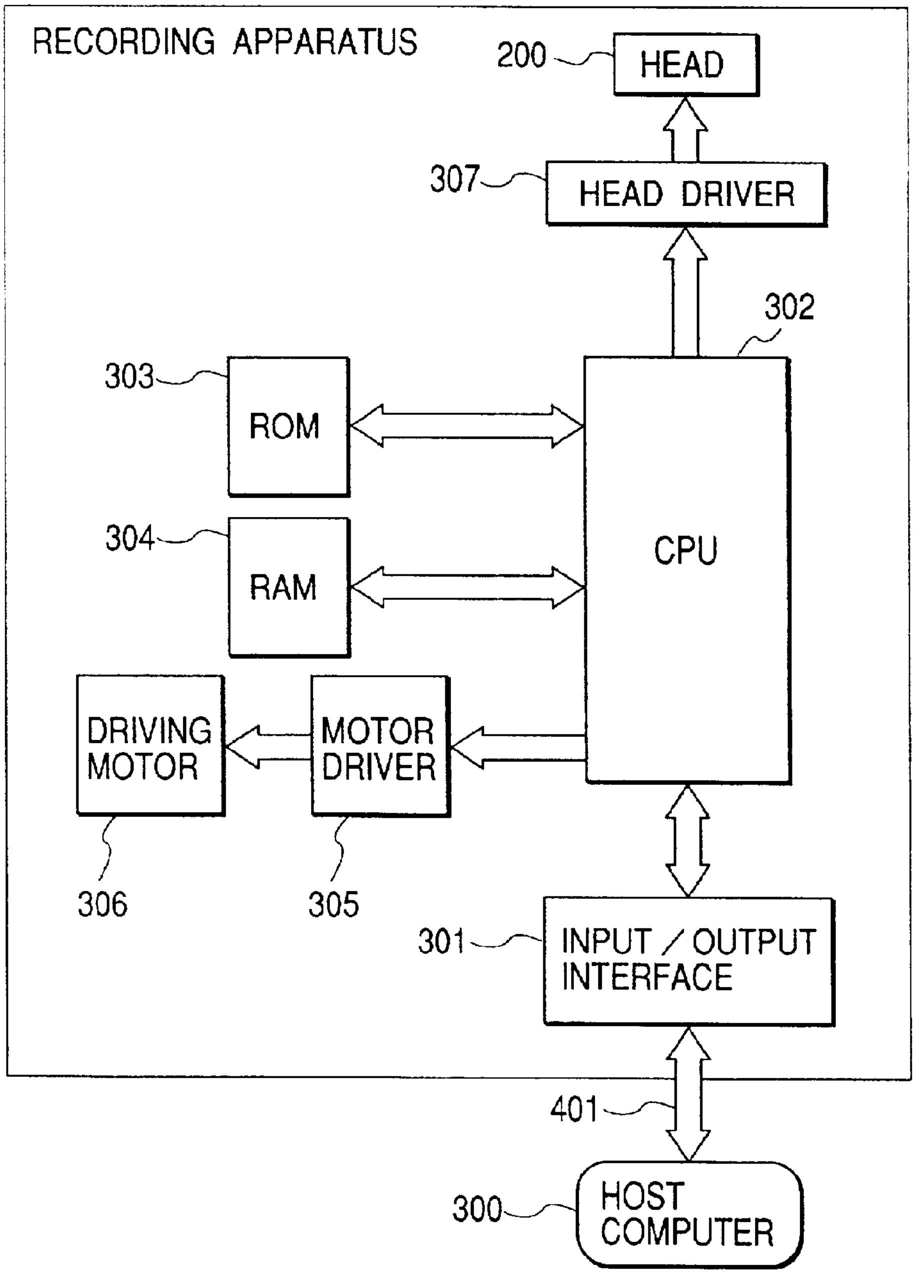
FIG. 13 is a block diagram of a whole of an apparatus for working an ink discharge and recording apparatus to which the liquid discharge head according to the present invention is applied.
Figure 14A:
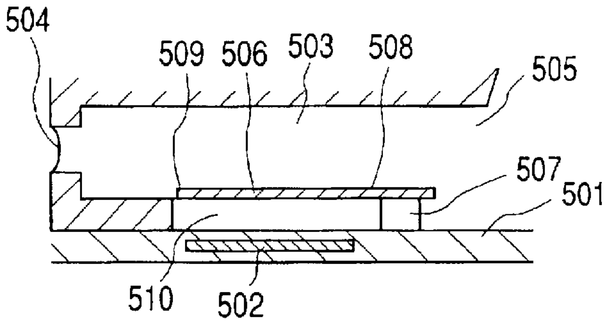
FIGS. 14A, 14B, 14C and 14D are figures for explanation of a principle of discharge in a conventional liquid discharge head.
Figure 14B:
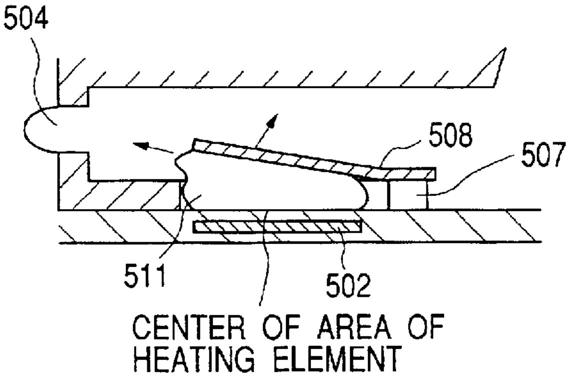
Figure 14C:
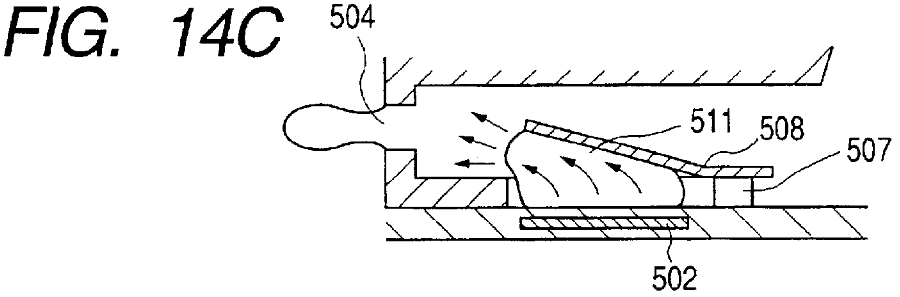
Figure 14D:
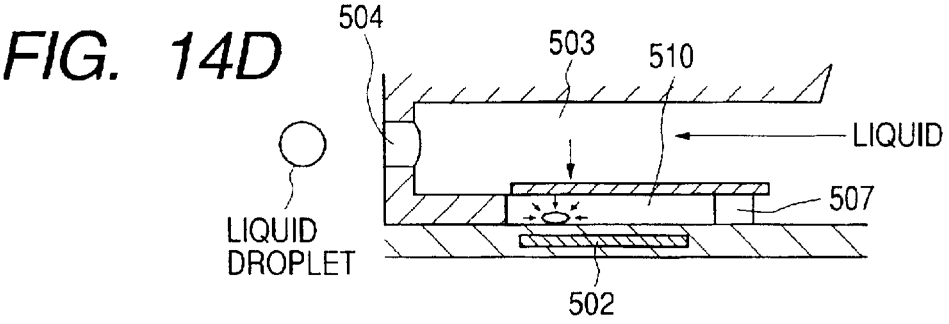
Figure 15:
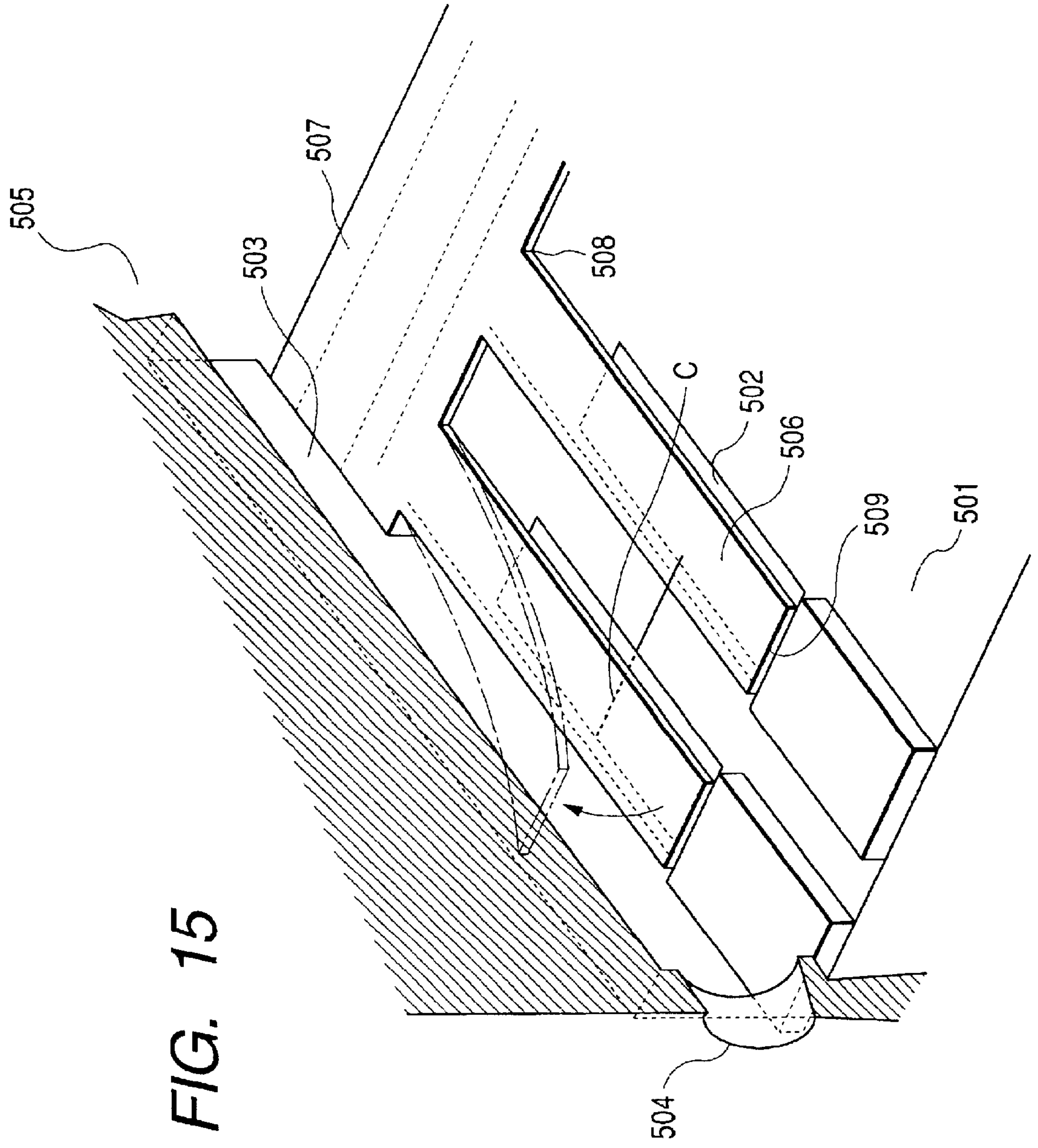
FIG. 15 is a partially broken-away perspective view of the liquid discharge head shown in FIGS. 14A, 14B, 14C and 14D.
Figure 16:
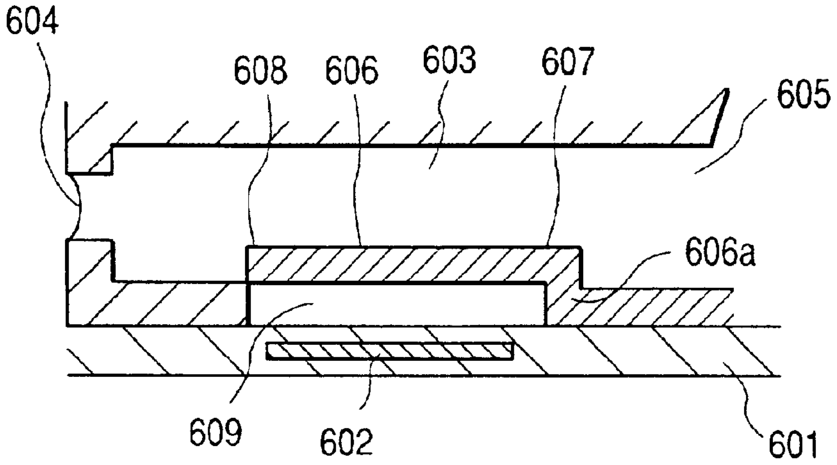
FIG. 16 is the sectional view of a modified example of the liquid discharge head shown in FIGS. 14A, 14B, 14C and 14D.

FIG. 13 is the block diagram of the whole of the apparatus for working the ink discharge and recording apparatus, to which the liquid discharge head according to the present invention is applied.

As shown in FIG. 13, the recording apparatus receives a printing information as a control signal 401 from a host computer 300. The printing information is temporarily stored in an input/output interface 301 installed inside the recording apparatus and simultaneously, is converted to a processible processing data in the recording apparatus and then, inputted to a CPU 302 also working head actuating signal supply means. The CPU 302 processes, based on a control program stored in an ROM 303, data inputted to the CPU 302 by using a peripheral unit such as an RAM 304 to convert to data (image data) for printing.

The CPU 302, in order to record the above described image data in a proper position on a recording paper, prepares a driving data for drive of a driving motor 306 to move the recording paper and the liquid discharge head 200 synchronizing with the image data. The image data is transmitted to the liquid discharge head 200 through a head driver 307 and a motor driving data is transmitted to the driving motor 306 through a motor driver 305. By this, the liquid discharge head 200 and the driving motor 306 are individually actuated with a controlled timing to form an image.

As the recording medium, that is applicable to the recording apparatus as described above and receives such liquid as ink, can be exemplified by various kinds of paper and OHP sheets, a plastic material used for a compact disk and a decorative plate, fabric, metal plate such as aluminum, copper, or the like, bovine skin, swine skin, leather material such as artificial leather, tree, wood such as plywood, plastic material such as tile, and three-dimensional structural body such as a sponge, or the like.

On the other hand, the recording apparatus as described above is exemplified by a printing apparatus to print on various kinds of paper and OHP sheets, the recording apparatus for plastics to record on the plastic material such as the compact disk, the recording apparatus for metal to record on a metal plate, the recording apparatus for leather to record on the leather, the recording apparatus for wood to record on wood, the recording apparatus for ceramics to record on ceramics, the recording apparatus to record on the three-dimensional structural body such as the sponge, or the like, and the printing apparatus to record on the fabric.

The discharging liquid used for these liquid discharge apparatus may be the liquid matching each recording medium and recording condition.

As described above, according to the liquid discharge head according to the present invention, there are no right-angled part and acute-angled part in the side part of the plate-like movable member, which is positioned oppositely to the discharge energy generating device, with a distance from the device and the edge of the side part is made to have the curved face, and the edge is chamfered and thus, even if the stress according to displacement of the movable member is applied to the movable member, it is prevented to cause cracks of the movable member and fracture of the movable member and durability of the movable member is improved. As a result, discharge characteristic of the liquid discharge head is stabilized and the liquid discharge head having the high reliability is realized.

Also, according to method of manufacturing the liquid discharge head according to the present invention, after a plurality of plate-like movable members are formed on the device substrate, on which a plurality of the discharge energy generating device are mounted, by the photolithographic technique, the right-angled part and the acute-angled part projecting from the edge part of the side part of the movable member are removed to make the edge of the side part to the curved face and to make the edge chamfered and thus, the liquid discharge head, of which durability of the movable member is improved, can be manufactured and the liquid discharge head, in which discharge characteristics is stable, and reliability is high, can be manufactured.

What is claimed is:

1. A method of manufacturing a liquid discharge head, the liquid discharge head comprising a device substrate, a liquid flow path having a bubble generating region for generating a bubble in liquid therein, a discharge energy generating device provided on the device substrate and arranged in the liquid flow path to generate thermal energy for generating the bubble in the liquid, a discharge port to discharge the liquid in the liquid flow path, the discharge port communicating with the liquid flow path, and a movable member mounted on the device substrate to face the discharge energy generating device with an interval with respect to the discharge energy generating device, the movable member having a fixed end part in an upstream side of the movable member in the direction of liquid flow in the liquid flow path and a free end at a downstream end of the movable member, said method comprising the steps of:

providing a sacrifice layer on the discharge energy generating device of the device substrate;

laminating a material to be the movable member on the sacrifice layer;

removing the sacrifice layer; and after removing the sacrifice layer, removing a right-angled part and an acute-angled part of an edge of the movable member facing the liquid flow path, by wet etching.

2. The method of manufacturing a liquid discharge head according to claim 1, wherein, in said step of removing a right-angled part and an acute-angled part of an edge of the movable member facing the liquid flow path, by wet etching, a curved surface is formed on the edge of the movable member.

3. The method of manufacturing a liquid discharge head according to claim 1, wherein, in said step of removing a right-angled part and an acute-angled part of an edge of the movable member facing the liquid flow path, by wet etching, the edge of the movable member is made chamfered.

4. The method of manufacturing a liquid discharge head according to claim 1, wherein said step of removing a right-angled part and an acute-angled part of an edge of the movable member facing the liquid flow path, by wet etching, further comprises radiating laser light on the edge of the movable member.

5. The method of manufacturing a liquid discharge head according to claim 1, wherein silicon nitride is used as the material of the movable member.

* * * * *

UNITED STATES PATENT AND TRADEMARK OFFICE

CERTIFICATE OF CORRECTION

PATENT NO. : 6,834,423 B2
DATED : December 28, 2004
INVENTOR(S) : Hiroyuki Sugiyama et al.

It is certified that error appears in the above-identified patent and that said Letters Patent is hereby corrected as shown below:

Column 2,
Line 59, "On" (second occurrence) should read -- on --.

Column 14,
Lines 6 and 26, "the" (second occurrence) should be deleted.

Column 16,
Line 56, "to" should read -- the --.

Column 17,
Line 17, "is become unnecessary" should read -- is unnecessary, --.
Line 18, "to simplify" should read -- thereby simplifying --.
Line 47, "the" (first occurrence) should be deleted.

Column 20,
Line 49, "method" should read -- the method --.

Signed and Sealed this

Thirtieth Day of August, 2005

JON W. DUDAS
*Director of the United States Patent and Trademark Office*